US008432395B2

(12) United States Patent
Andre et al.

(10) Patent No.: US 8,432,395 B2
(45) Date of Patent: Apr. 30, 2013

(54) METHOD AND APPARATUS FOR SURFACE CONTOUR MAPPING

(75) Inventors: Bartley K. Andre, Menlo Park, CA (US); Scott Cannon, Mountain View, CA (US); Patrick Kessler, Mountain View, CA (US)

(73) Assignee: Apple Inc., Cupertino ( * ) Notice: Subject to any disclaimer, the term of this patent is extended or adjusted under 35 U.S.C. 154(b) by 892 days.

(21) Appl. No.: 12/558,414

(22) Filed: Sep. 11, 2009

(65) Prior Publication Data
US 2010/0315422 A1 Dec. 16, 2010

Related U.S. Application Data

(60) Provisional application No. 61/187,562, filed on Jun. 16, 2009.

(51) Int. Cl.
*G06T 15/50* (2011.01)
(52) U.S. Cl.
USPC .......................................... 345/426; 345/421
(58) Field of Classification Search .................. 345/426, 345/421
See application file for complete search history.

(56) References Cited

U.S. PATENT DOCUMENTS

| 6,392,754 | B1 * | 5/2002 | Pingel et al. ................. 356/603 |
| 6,603,542 | B1 | 8/2003 | Chase et al. |
| 6,906,809 | B2 | 6/2005 | Fujiwara et al. |
| 7,440,119 | B2 | 10/2008 | Iwasaki |
| 7,454,054 | B2 | 11/2008 | Fukumoto |
| 2005/0238237 | A1 * | 10/2005 | Haeusler et al. ............. 382/203 |

FOREIGN PATENT DOCUMENTS

WO WO2009/078617 6/2009

OTHER PUBLICATIONS

Wang et al. "Determining Shape of Specular Surfaces", The 8th Scandinavian Conference on Image Analysis, Tromso, Norway, May 25-28, 1993, pp. 1193-1194.*
Jeong et al. "Profile measurement of a partially specular object using spatial light modulation" International Conference on Control, Automation and Systems 2008 Oct. 14-17, 2008 in COEX, Seoul, Korea, p. 524.*
Kutulakos et al. "A Theory of Refractive and Specular 3D Shape by Light-Path Triangulation", Department of Computer Science, University of Toronto, Toronto ON, Canada M5S 3G4, IEEE 2005, p. 19.*

* cited by examiner

*Primary Examiner* — Maurice L McDowell, Jr.
(74) *Attorney, Agent, or Firm* — Womble Carlyle Sandridge & Rice LLP

(57) ABSTRACT

The three dimensional surface shape of a specular reflective object can be determined by examining a captured image reflected from the object. Flat specular reflective surfaces, e.g. a mirror, provide an undistorted reflected image, while curved surfaces reflect a distorted image altered by the surface shape. By analyzing one or more captured images of the distorted reflection, one can estimate the shape of the surface that caused the distortion. A captured distorted image can be compared to a reference undistorted image for which one knows some geometric properties. A system to capture and process such images can be assembled from a few components including a computer to generate and process the images, a display to project the image onto the reflective object, a digital camera to capture the reflected image and a positioning device on which to orient the components with respect to each other.

20 Claims, 21 Drawing Sheets

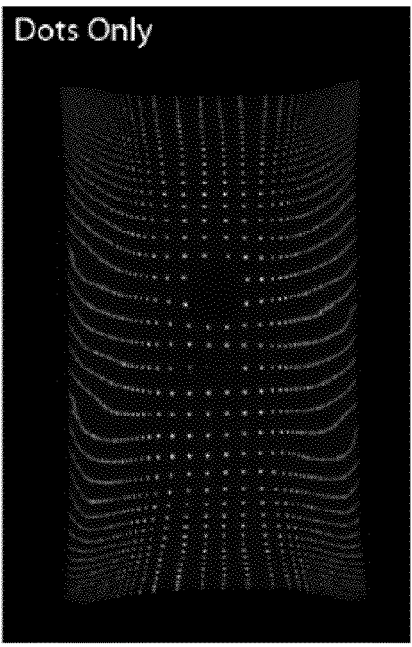
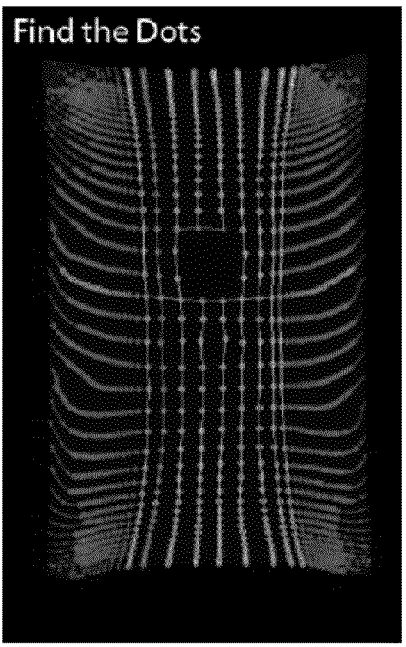
Figure 13A    Figure 13B
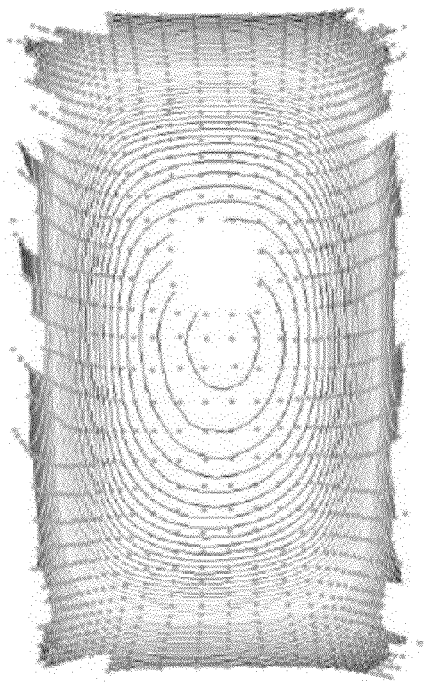
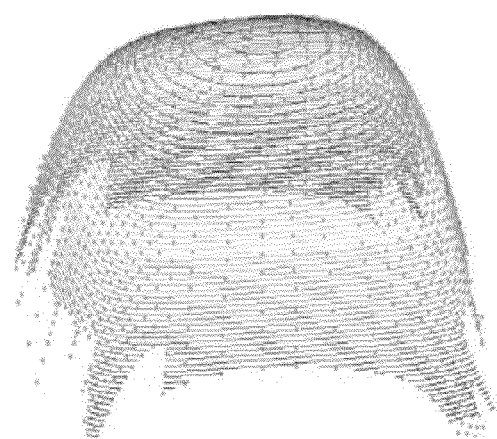
Figure 13C    Figure 13D

METHOD AND APPARATUS FOR SURFACE CONTOUR MAPPING

CROSS-REFERENCE TO RELATED APPLICATIONS

This patent application claims the benefit of priority under 35 U.S.C. 119(e) to U.S. Provisional Patent Application Ser. No. 61/187,562 filed on Jun. 16, 2009 entitled "REFLECTIONS ON SHAPE" by Andre et al. which is hereby incorporated by reference herein for all purposes.

TECHNICAL FIELD

The present invention relates generally to the estimation of a three dimensional surface shape of an object. More particularly, methods, software, hardware, and systems are described for rapidly determining the surface profile of an object from a photographic image of a reflected light pattern from the object.

BACKGROUND OF THE INVENTION

Accurately measuring the three dimensional shape of a manufactured part, such as a casing or enclosure, can be accomplished using a mechanical profilometer, which measures a vertical displacement of a stylus in contact with the manufactured part for different horizontal movements. While accurate, the mechanical profilometer can be slow and therefore inappropriate in a high volume manufacturing or a rapid prototyping environment that requires quick results. In addition contact measurement can be undesirable because of potential damage to the surface of the manufactured part. Alternatively, non-contact optical profilometers have been developed that can measure laser generated light reflected from the surface of a measured part as shown in FIG. 1. A laser 101 can direct light in a narrow angle onto the surface of a measured part 106. If the measured part surface 106 reflects the light diffusely, then a portion of the light (diffuse reflected main beam 104) reflected at point "r" can be captured by a camera 102 located at a fixed position. Depending on the surface reflectivity of the measured part, the camera 102 can also receive at the same fixed position a specular reflected side beam 105 reflected from point "q". Because of the narrow angle of light emitted from the laser 101, this reflected side beam 105 can be much weaker than a specular reflected main beam 103, which cannot be captured by the camera 102 at its fixed location, as the specular reflected main beam 103 falls outside the camera's field of view. Laser profilometers typically measure shape using the "main beam" light reflected from the point "r" rather than the "side beam" light reflected from the point "q" and therefore prefer a sufficiently matte, diffusely reflecting, surface. A specular reflective surface can be sprinkled with talcum powder, for example, to render the surface suitable for laser measurement. While again such systems can provide accurate results, the measurement process can be slow, and the specialized measurement equipment can be costly. Thus there exists a need for a low cost measurement method and system to estimate the shape of parts with specular reflective surfaces appropriate for high volume manufacturing.

SUMMARY OF THE DESCRIBED EMBODIMENTS

A method for estimating a three-dimensional surface shape of an object having a specular reflective surface is disclosed. The method can be carried out by at least projecting a image pattern on the specular reflective surface, capturing a reflected image pattern from the specular reflective surface by an image capture device, comparing a set of two-dimensional reflected image points in the reflected image pattern to the projected image pattern to generate an estimate of the three-dimensional surface shape of the reflective object, and displaying the estimate of the three-dimensional surface shape of the reflective object.

In another embodiment, a method for estimating a three-dimensional surface shape of an object having a specular reflective surface is disclosed. The method includes at least the following operations: calibrating a position and direction of an image capture device relative to a support member of a positioning assembly, projecting by a light transmitting device an image pattern on the specular reflective surface positioned on the support member of the positioning assembly, capturing by the image capture device an image reflection of the transmitted image pattern reflected by the specular reflective surface, determining adjacency information between a plurality of two-dimensional points in the captured image reflection, estimating a three-dimensional point of the surface of the reflective object that corresponds to a two-dimensional point in the captured image reflection by minimizing a curvature function of a path that connects the first three-dimensional point to a previously estimated three-dimensional point of the surface that corresponds to an adjacent two-dimensional point in the captured image reflection, and displaying the estimated three-dimensional surface shape of the reflective object.

In yet another embodiment, a method for estimating a three-dimensional shape of an object having a specular reflective surface is disclosed. The method includes at least the following: projecting a set of image patterns on the specular reflective surface, capturing a set of reflected image patterns reflected by the specular reflective surface, generating a set of estimates of the three-dimensional surface shape of the reflective object, each estimate at least covering a different region of the specular reflective surface, by comparing each member of the set of reflected image patterns to a corresponding member of the set of projected image patterns, generating a composite estimate of the three-dimensional shape of the reflective object by combining portions of each of the set of estimates of the three-dimensional shape of the reflective object, and displaying the composite estimate of the three-dimensional surface shape of the reflective object.

In still another embodiment, an apparatus is described. The apparatus including at least the following, a processing unit, a light projecting device coupled with the processing unit, a fixturing device arranged to secure a part under test, and a light capturing device coupled with the processing unit, wherein the processing unit renders a pattern, the pattern being formed of a plurality of repeating regular shapes. The light projecting device projects the pattern onto a surface of the part under test. The projected pattern undergoes specular reflection from the surface and is captured by the light capturing device. The captured image is processed by the processing unit, the processed image used to evaluate a surface quality of the surface of the part under test.

In yet another embodiment, an apparatus for estimating a three dimensional surface shape of an object having a specular reflective surface, the apparatus includes at least a light transmitting device for projecting an image pattern on the specular reflective surface, an image capture device for capturing an image reflection of the transmitted image pattern reflected from the reflective object, and a computational device configured to estimate a three dimensional surface point of the reflective object using a set of two dimensional reflected image points calculated from a binary pixilated image generated from the captured image reflection.

BRIEF DESCRIPTION OF THE DRAWINGS

The invention and the advantages thereof may best be understood by reference to the following description taken in conjunction with the accompanying drawings.

FIGS. 13A, 13B, 13C and 13D illustrate captured images and surface shape estimates of a reflective object.

DETAILED DESCRIPTION OF EXAMPLE EMBODIMENTS

Figure 1:
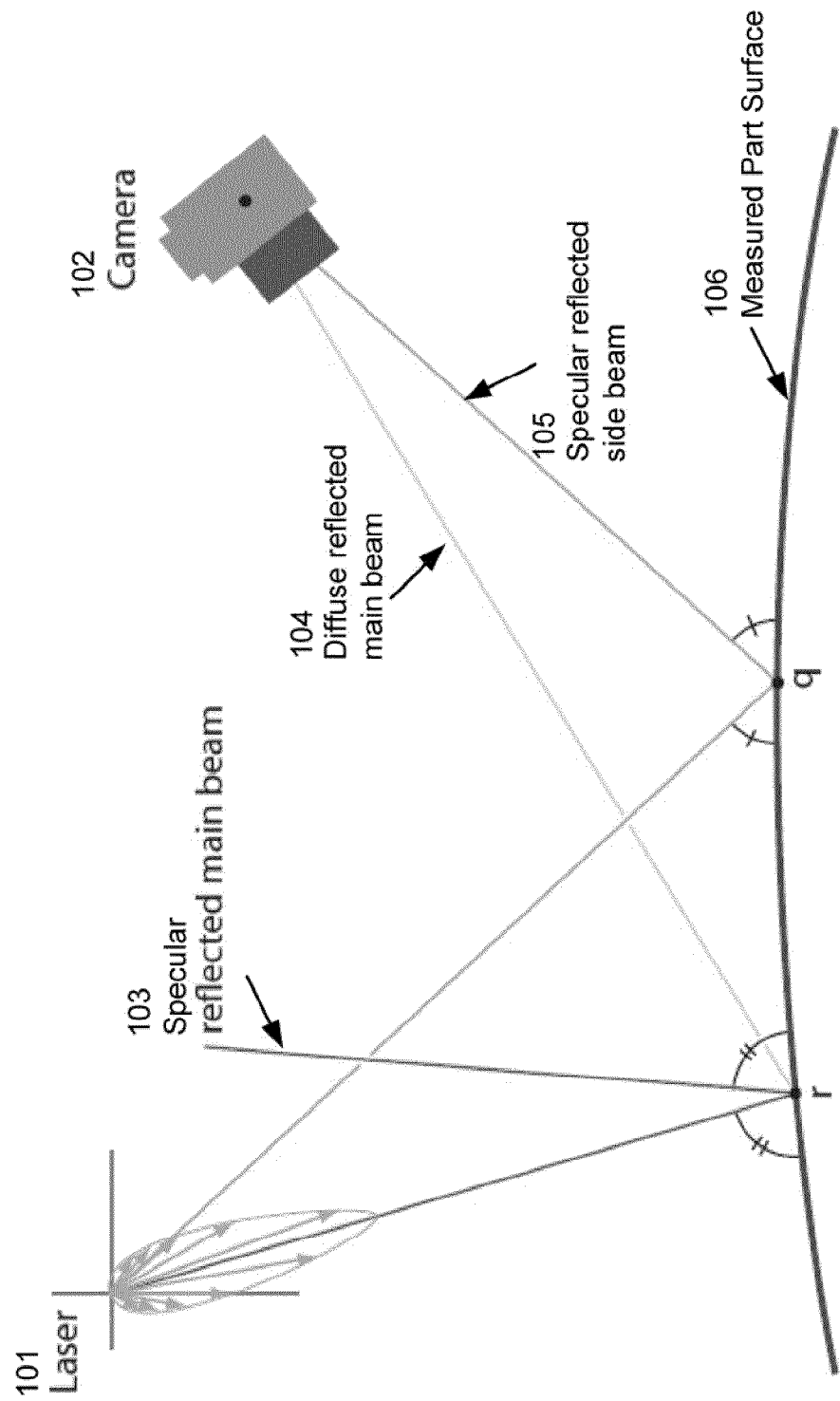
FIG. 1 illustrates a prior art optical measurement system.

The present invention relates generally to the estimation of a three dimensional surface shape of an object. More particularly, methods, software, hardware, and systems are described for rapidly determining the surface profile of a reflective object from a photographic image of a reflected light pattern.

In the following description, numerous specific details are set forth to provide a thorough understanding of the present invention. It will be apparent, however, to one skilled in the art that the present invention may be practiced without some or all of these specific details. In other instances, well known process steps have not been described in detail in order to avoid unnecessarily obscuring the present invention.

The three dimensional surface shape of a specular reflective object can be determined by examining a captured image reflected from the object. Flat specular reflective surfaces, e.g. a mirror, provide an undistorted reflected image, while curved surfaces reflect a distorted image altered by the surface shape. Even small surface irregularities can become large distortions in the reflected image. By analyzing one or more captured images of the distorted reflection, one can estimate the shape of the surface that caused the distortion. A captured distorted image can be compared to a reference undistorted image for which one knows some geometric properties. For example, one can project a predetermined patterned image onto the reflective object and compare the predetermined pattern to a distorted reflection of the image pattern. A system to capture and process such images can be assembled from a few components including a computer to generate and process the images, a display to project the image onto the reflective object, a digital camera to capture the reflected image and a positioning device on which to orient the components with respect to each other.

A system for rapidly determining the surface shape of a reflective object, such as a glossy plastic or polished metal surface enclosure part, is disclosed herein. An embodiment of the system can use a digital camera to capture an image pattern (e.g. dot or line grid) reflected from the reflective object's surface. The captured image can be processed in a computational device to calculate the reflective object's shape and generate a three dimensional surface estimate and a surface contour map that illustrates surface deformation. For an image containing a number of distinguishable points, one can correlate points in the distorted reflected image to corresponding points in the original projected image and equivalently to points on the surface of the reflective object. Using the law of reflection, one can determine an orientation of the reflective surface at the distinguishable image points that depends on the distance between the reflective surface and the digital camera. For a relatively smoothly varying surface, the three dimensional surface estimate can be constructed iteratively using estimates of the surface orientation determined at image points nearby. The surface estimate and contour map can be used by manufacturing engineers to iterate rapidly and optimize a manufacturing process through a series of measurement experiments. The system can also provide quality engineers a low cost system to inspect manufactured parts in high volume. The disclosed system and method can be substantially faster and lower cost in operation that prior art laser and charge couple device systems and methods.

Figure 2:
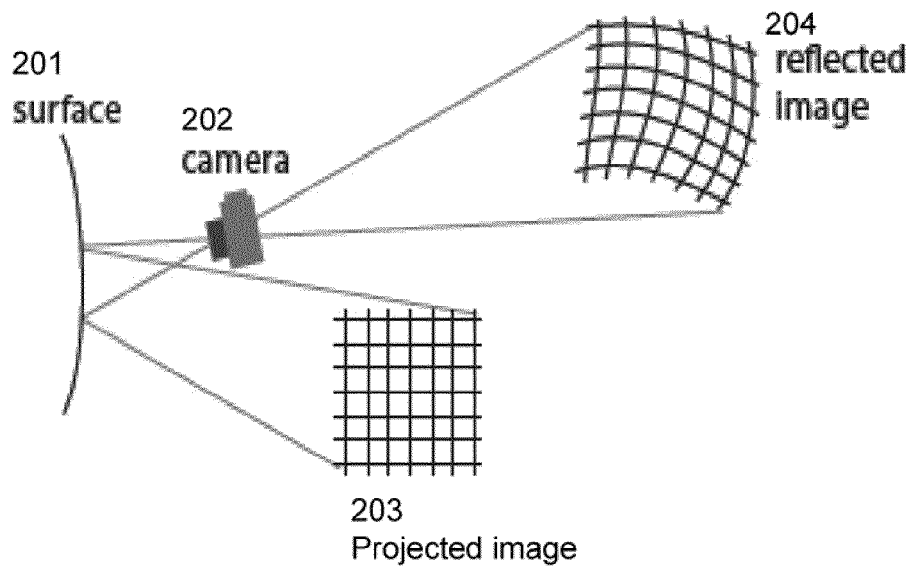
FIG. 2 illustrates distortion of a projected image by a specular reflective surface.

FIG. 2 illustrates a projected image pattern 203 captured by a camera 202 after reflection from a specular reflective surface 201. The captured reflected image 204 shows a distorted version of the projected image 203, where distortions in the reflected image can be correlated to the reflective surface 201 shape. Specular reflected images can reveal surface irregularities more readily than an image projected onto a diffuse reflective surface, as differences in surface orientation between adjacent points on the surface are magnified in the reflected image as the distance between the camera 202 and the specular reflective surface 201 increases. The captured two dimensional reflected image 204 can be used to estimate the three dimensional shape of the specular reflective surface 201.

Figure 3:
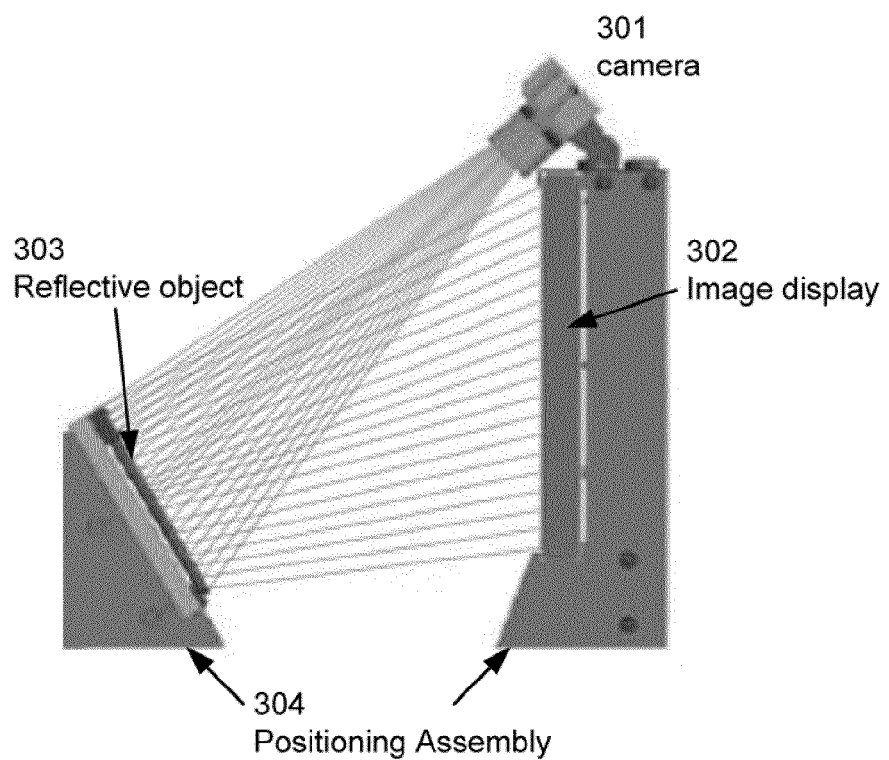
FIG. 3 illustrates an embodiment of a system to estimate the shape of a specular reflective object.

FIG. 3 illustrates an embodiment of a system for estimating the surface shape of a reflective object 303 in which a camera 301 captures a reflection from the reflective object 303 of an image pattern projected by an image display 302. The camera 301, image display 302 and the reflective object 303 can be oriented spatially with respect to each other by a positioning assembly 304. In an embodiment, the camera 301 can be adjusted to face the reflective object 303 to capture the reflected image. Depending on the size and shape of the reflective object 303, the lens attached to the camera 303 can be chosen to capture a preferred portion of the reflected image. The positioning assembly 304 can include a first member on which to place the reflective object 303 and orient its position with respect to the camera 301 and the image display 302 mounted on a second member of the positioning assembly 304. Rather than only adjusting the lens of the camera 301 to change the field of view, the positioning assembly 304 can also be adjustable allowing for different distances between the reflective object 303, the camera 301 and the image display 302. The image display 302 can project an image pattern that includes a plurality of light and dark regions so that the light regions can be captured by the camera 301. While a preferred embodiment of the invention described herein can use an array of light dots arranged in a regular grid on a dark background, other pattern images can also be used such as a grid pattern of light and dark lines or a checkerboard pattern of light and dark squares. In some embodiments the image display 302 can project a pixilated image.

Figure 4:
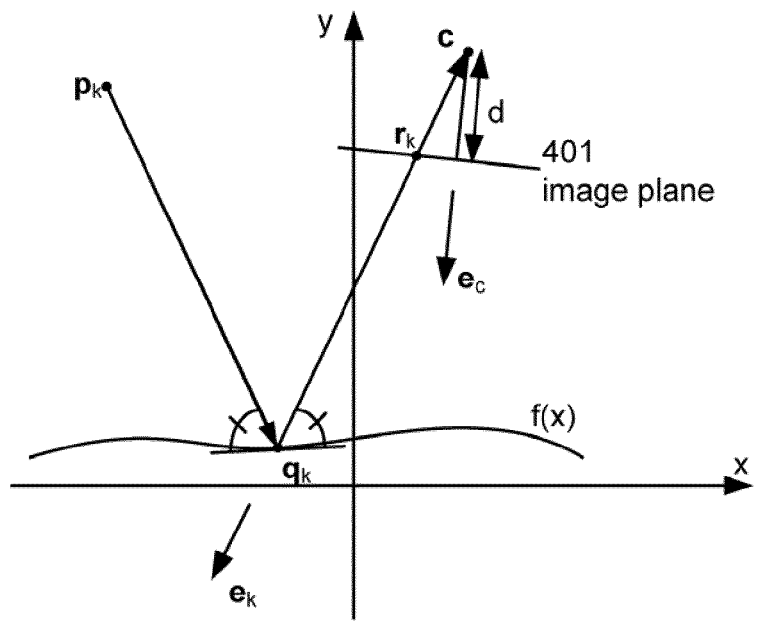
FIG. 4 illustrates a two-dimensional mathematical model for measurement of a reflection.

FIG. 4 illustrates a light ray originating from a point $p_k$ (which can represent one or more pixels of an image display device) and travelling toward a reflective surface depicted as curve f(x). (Vectors are denoted by bold face herein.) The light ray can reflect from a point $q_k$ on the curve f(x), where the angle of incidence of the light ray can equal the angle of reflection with respect to a tangent of the curve f(x) at $q_k$. The light ray can pass through a point $r_k$ of an image plane 401 in a camera positioned at point c. The camera can be pointed in a direction defined by a unit vector $e_c$ perpendicular to the image plane 401. The reflected light ray can travel from the point $q_k$ to the point c along a direction $-e_k$. (Note that the unit vectors $e_c$ and $e_k$ are generally not coincident.) In one embodiment, multiple points $p_1, p_2, \ldots, p_N$ arranged in a line can be projected on the curve f(x) resulting in a set of points $r_1, r_2, \ldots, r_N$ received on the image plane. The curve f(x) can be reconstructed using the set of received points $r_1, r_2, \ldots, r_N$ using knowledge of the transmitted points $p_1, p_2, \ldots, p_N$.

The distance d between the image plane 401 and the camera position c can be determined by comparing an actual distance of a reference feature on an object to a dimension in a captured image of the reference feature. In one embodiment, the reference feature can be a pair of distinguishable marks scribed on a part of the positioning assembly 304. In another embodiment, the reference feature can be a pair of distinguishable marks projected onto a flat object positioned in the positioning assembly 304. For an actual distance B between the two distinguishable marks on the object and a measured distance D from the reference feature to the camera position c, the distance d=(bD)/B. Calibration of the system shown in FIG. 3 can include rotating the camera to position one or more reference marks on the positioning assembly (or on a reference object placed in the positioning assembly) to preferred locations in a viewed camera image, e.g. in an optical viewfinder or on an electronic display. Calibration can also include determining the distance d between the camera position c and the image plane. In general, a set of points $\{p_k\}$ can result in a set of points $\{r_k\}$ on the image plane 401. Portions of the function f(x) (or more generally a three dimensional surface) that curve inward (concave) can cause adjacent image points in the set of points $\{p_k\}$ to converge in a captured image, while portions that curve outward (convex) can cause adjacent image points to diverge. For a region R of a surface that reflects a pattern P into the camera, let g(P) denote the captured image pattern. To determine the shape of the surface region R, the mapping g(•) can be an injective function, i.e. g(•) can be a function (cannot map one point $p_k$ to multiple image points $r_k$) and g(•) can be one-to-one (cannot map two different points $p_k$ to a single image point $r_k$). If each image point $r_k$ can be linked to a unique source point $p_k$ (e.g. by using different colored source points, or by flashing the source points on/off at different times) then the shape of the region R can be uniquely determined. The shape of region R can also be determined by iteratively constructing a surface estimate starting from one or more distinct image points as outlined further herein.

Figure 5A:
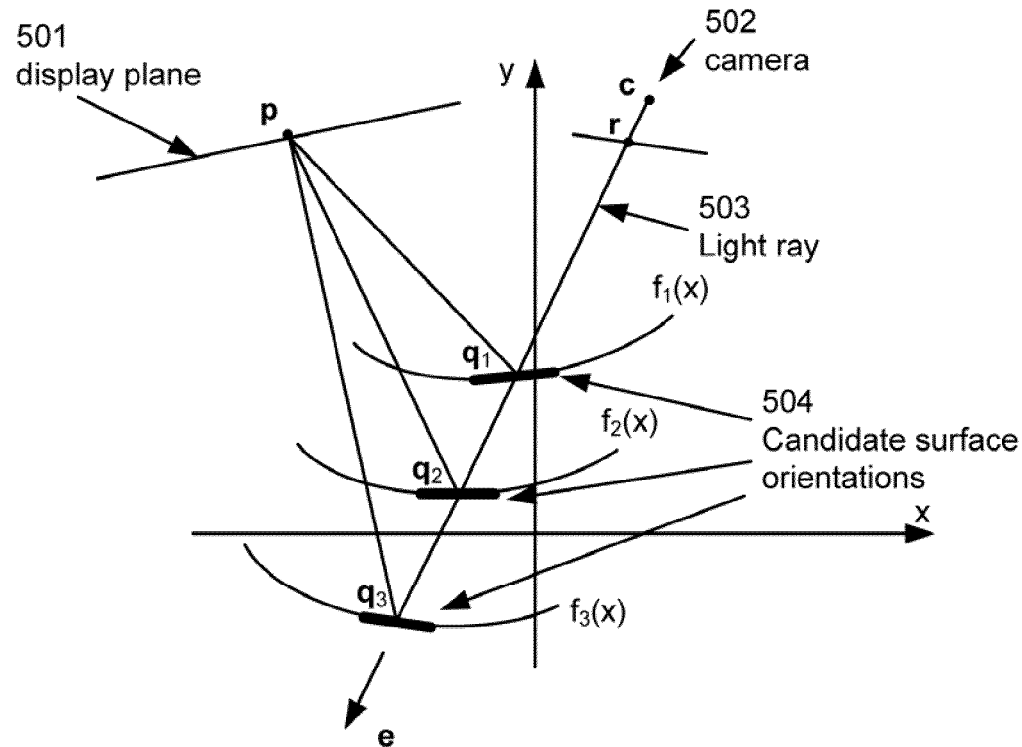
FIG. 5A illustrates multiple candidate reflective surface orientations for a fixed image capture position.
Figure 5B:
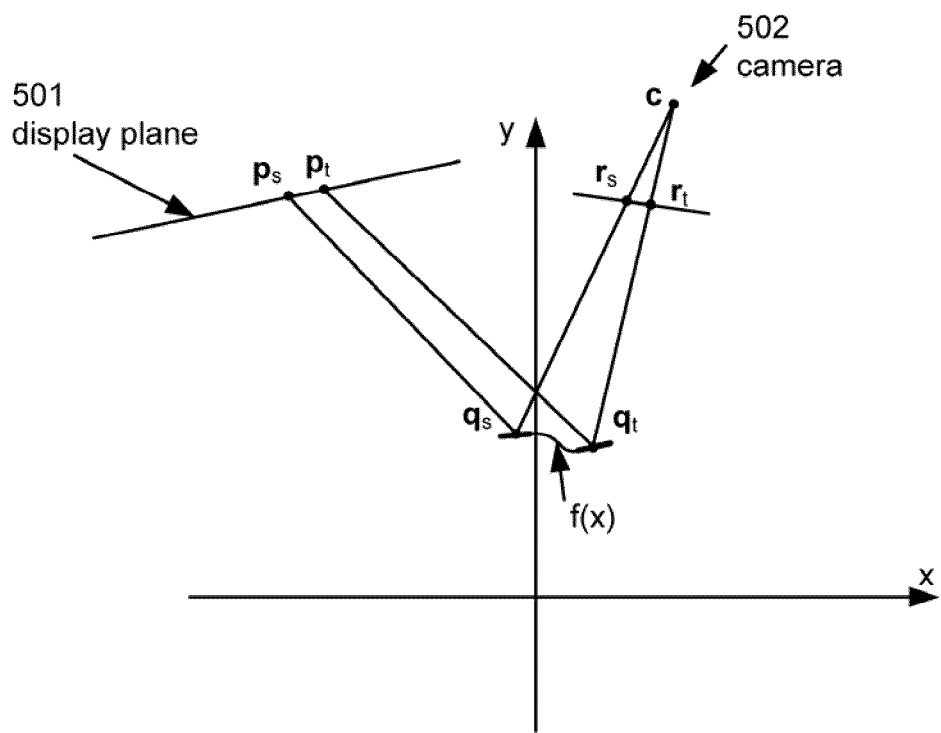
FIG. 5B illustrates connecting two neighboring points on a reflective surface estimate.

As shown in FIG. 5A, each ray of light entering a camera 502 along a light ray 503 and originating from a point p on a display plane 501 can be reflected by any of a plurality of surfaces. A single point r in a captured image can result from light reflected from the curve $f_1(x)$ at point $q_1$, or from curve $f_2(x)$ at point $q_2$, or from curve $f_3(x)$ at point $q_3$. As the angle of incidence must equal the angle of reflection at any reflective point, one can determine candidate surface orientations 504 at each possible intersecting reflective point along the direction –e into the camera 502. (The unit vector e in FIG. 5A corresponds to the unit vector $e_k$ in FIG. 4.) For a light ray that originates at the point p on the display plane 501 and a function f(x) that crosses the light ray 503 at a distance l away from the camera c, a unit tangential t and a unit normal n to the surface f(x) at a reflection point q is given by Equation (1)

$$t = -\frac{u+e}{\|u+e\|}, n = \frac{u-e}{\|u-e\|}, \qquad (1)$$

where the reflection point q=c+le, and u is defined as the unit vector in the direction p–q. Each point r in a captured image can result from any of a plurality of surfaces, each positioned at a different distance from the camera c. To resolve this ambiguity, one can use information about the surface orientation determined for points in the captured image near the point r. As shown in FIG. 5B, starting with a first received image point $r_s$, for which one has determined a surface orientation that can occur at a corresponding reflection point $q_s$, one can determine a function f(x) that connects the reflection point $q_s$ to a reflection point $q_t$ that corresponds to a neighboring adjacent point $r_t$ in the captured image. Obviously numerous different functions can connect two points. In a preferred embodiment, one can use a smooth function that is tangential to the surface at each reflection point and has minimum curvature in between as will be detailed next.

Figure 6:
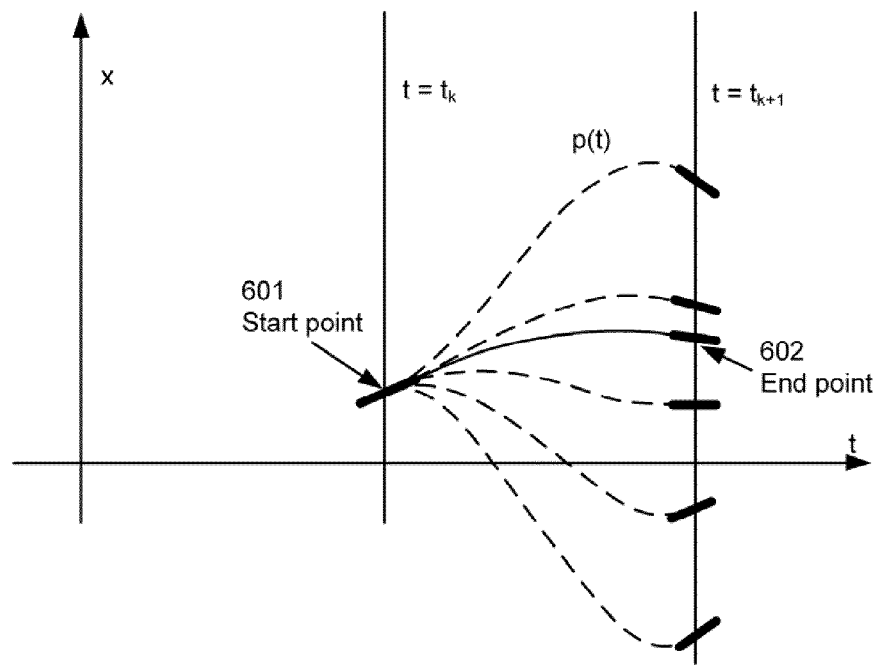
FIG. 6 illustrates connecting multiple candidate reflective surface orientations to a known start point surface.

FIG. 6 illustrates a first reflection point (start point 601 at $t=t_k$) having a known surface orientation that can connect to any one of a plurality of second reflection points (at $t=t_{k+1}$), each with a different surface orientation. The path p(t) that connects the two reflection points is tangential to the corresponding surface orientations at those reflection points, i.e. at $t=t_k$ and $t=t_{k+1}$. In one embodiment, p(t) is chosen to be a cubic polynomial function that connects the two reflection points. In a preferred embodiment, the path p(t) is chosen to minimize a curvature function($C^2=\ddot{x}_k^2+\ddot{x}_{k+1}^2$). In FIG. 6, the cubic polynomial path p(t) with minimum curvature is shown connecting the start point 601 to an end point 602. To determine which end point 602 results in the path p(t) with minimum C, we can iteratively solve for a value of $x_{k+1}=\gamma$. For each $\gamma$, the cubic polynomial path p(t) between $t_k$ and $t_{k+1}$ that has the correct slope at both the start point 601 ($t=t_k$) and at an end point ($t=t_{k+1}$) can be given by Equation (2)

$$p(t)=x_k a(t)+\dot{x}_k \alpha(t)+\gamma b(t)+g(\gamma)\beta(t) \quad (2)$$

where $g(\gamma)=f(\gamma,t_{k+1})$, and where the basis polynomials a(t), b(t), $\alpha$(t), and $\beta$(t) can be given by Equations (3), (4), (5) and (6)

$$a(t) = \frac{2}{d^3}(t-d/2)^3 - \frac{3}{2d}(t-d/2) + \frac{1}{2} \quad (3)$$

$$\alpha(t) = \frac{t}{d^2}(t-d)^2 \quad (4)$$

$$b(t) = \frac{2}{d^3}(d/2-t)^3 - \frac{3}{2d}(d/2-t) + \frac{1}{2} \quad (5)$$

$$\beta(t) = \frac{t^2}{d^2}(t-d) \quad (6)$$

where $d=t_{k+1}-t_k$. The curvature function C is the 2-norm of $u=a+\gamma b+g(\gamma)c$ where $$a = x_k \frac{6}{d^2}\begin{bmatrix}-1\\1\end{bmatrix} + \dot{x}_k \frac{2}{d}\begin{bmatrix}-2\\1\end{bmatrix} \quad (7)$$

$$b = \frac{6}{d^2}\begin{bmatrix}1\\-1\end{bmatrix} \quad (8)$$

$$c = \frac{2}{d}\begin{bmatrix}-1\\2\end{bmatrix} \quad (9)$$

The nonlinearity of the function $g(\gamma)$ is usually weak, and so an iteration as defined in Equation (10)

$$\gamma_{i+1} = \gamma_i - \frac{\langle(a+g(\gamma_i)c), b\rangle}{\langle b, b\rangle} \quad (10)$$

can converge to a value for $x_{k+1}$ to within a preferred level of numerical precision within a few steps. Herein the notation <a,b> denotes a dot product between vectors a and b. By choosing a smooth, cubic polynomial path p(t) with least curvature, one minimizes changes in slope between the start point and the end point where one lacks information.

Figure 7:
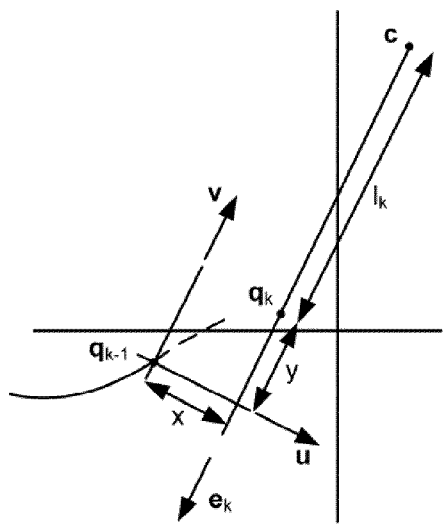
FIGS. 7 and 8 illustrate additional mathematical models for measurement of a reflection.

FIG. 7 applies the idea discussed above with respect to FIG. 6 to extending a curve that can start at point $q_{k-1}$ and can end at a point $q_k$. For a light ray entering a camera situated at point c along a direction $-e_k$, one can determine a slope for each possible reflection point that can occur along the light ray. Suppose we have determined the point $q_{k-1}$ (and necessarily the slope at $q_{k-1}$), and we want to find the point $q_k=c+l_k e_k$ along the light ray (i.e. determine the distance $l_k$ between the reflection point $q_k$ and the camera point c). Consider the unit vectors u and v defined to be perpendicular to and tangential to the light ray into the camera point c respectively. In particular let $v=-e_k$ and $u=Re_k$, where $$R = \begin{bmatrix} 0 & -1 \\ 1 & 0 \end{bmatrix}$$

is a 90 degree counter clockwise rotation matrix. Using the rotated (u,v) coordinate system let x be the distance in the u direction and y be the distance in the v direction from the point $q_{k-1}$ to the point $q_k$. Because the distance $l_k$ can be given by $l_k=<e_k,q_{k-1}-c>-y$, one can determine $l_k$ by solving for the distance y. Solving for the point $q_k$ is the same as described for determining the position of the end point 602 in FIG. 6 (where the rotated axes u and v in FIG. 7 correspond to the axes t and x in FIG. 6 respectively). A normal vector n perpendicular to curves that cross the light ray at different values of y can be determined using Equation (1). The corresponding slope of the curve at the point $q_k$ in the rotated coordinate frame can be determined by Equation (11)

$$\frac{dy}{dx} = -\frac{\langle n, u\rangle}{\langle n, v\rangle}. \quad (11)$$

The values of the distance y and the slope $$\frac{dy}{dx}$$

in equation (11) correspond to the values $\gamma$ and $g(\gamma)$ used for the iteration of Equation (10). Thus we can use the iterative method described above to determine a solution for the point $q_k$.

Figure 8:
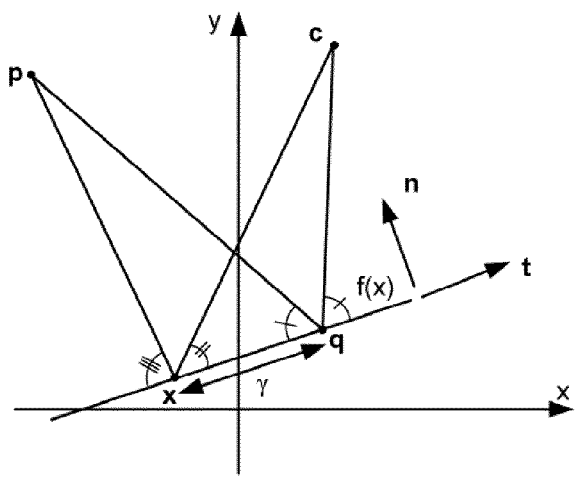

Accuracy of the method described above for determining an estimate of a point on a surface can be checked by simulating an image capture. In the simplest case, consider a reflective surface f(x) that is a line as shown in FIG. 8. Define n and t to be the unit normal and unit tangential vectors to the line $f$(x) respectively, and let x be a point on the line that is not necessarily the reflection point. (Note that the angle of incidence and the angle of reflection are shown as unequal at the point x and equal at the reflection point q.) The reflection point $q=x+\gamma t$ on the line $f$(x) for light originating from a point p can be given by Equation (12).

$$\gamma = \frac{\langle n, c-x\rangle\langle t, p-x\rangle + \langle n, p-x\rangle\langle t, c-x\rangle}{\langle n, c-x\rangle + \langle n, p-x\rangle} \quad (12)$$

If the reflective surface f(x) is a curve instead of a line, then one can iterate a sequence of points $x_i$ such that the reflection point $$q = \begin{bmatrix} \tilde{x} \\ f(\tilde{x}) \end{bmatrix}$$

is defined by a limit $\tilde{x}$ of the sequence of points $x_i$. Given a reflective surface f(x) and a set of points $p_k$, with these constructions one can generate each of the resulting image points $r_k$ captured on the image plane of the camera situated at point c. Thus one can simulate capturing an image of a reflection. To test the accuracy of the surface estimation method described above, one can start with a known reflective surface f(x), use ray tracing to compute a set of points of a simulated captured image, construct an estimate of the reflective surface g(x) from the simulated captured image, and compute a error difference f(x)−g(x) between the original reflective surface $f$(x) and the constructed reflective surface g(x).

Figure 9:
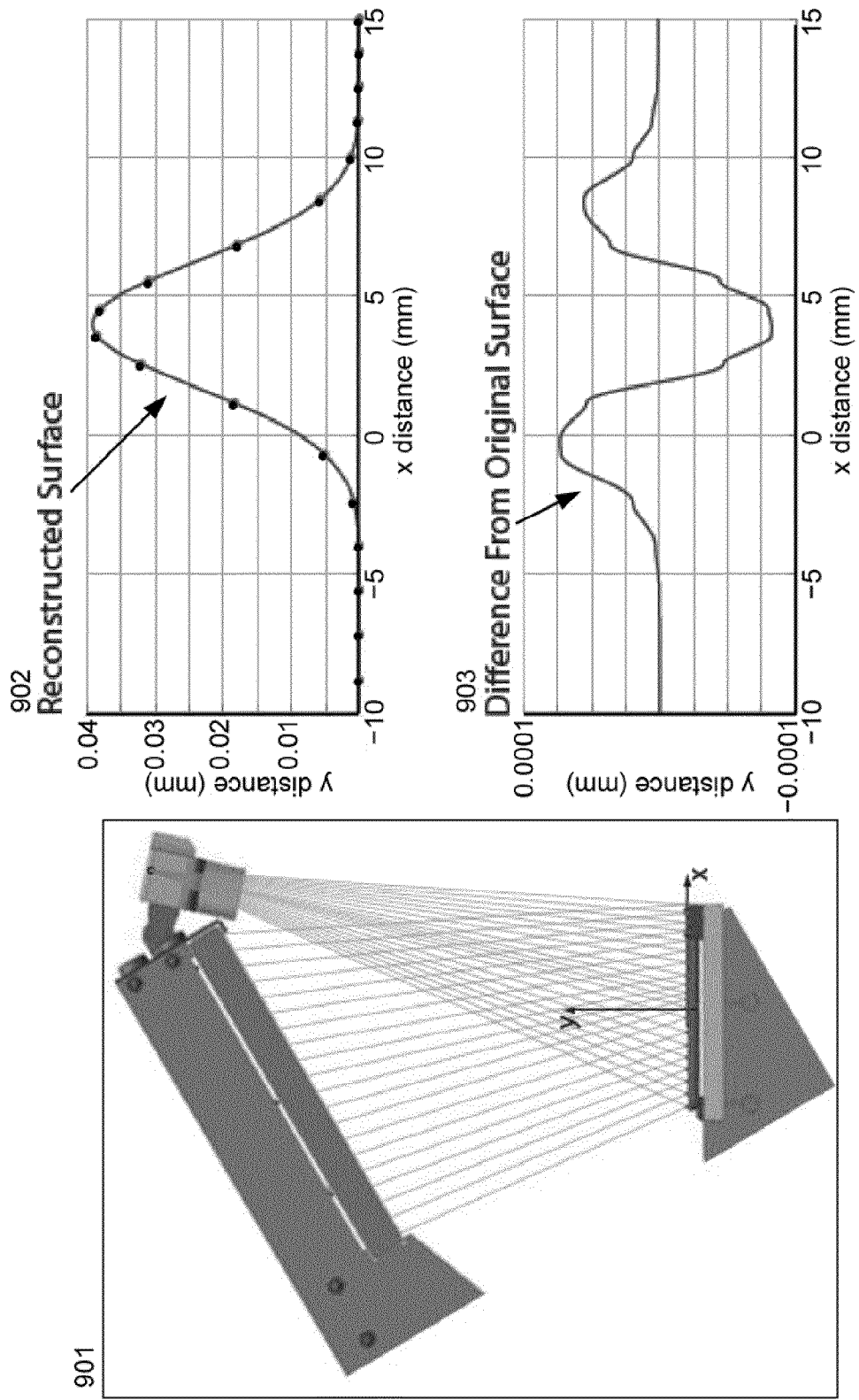
FIG. 9 illustrates a reconstructed surface shape and an estimation error.

FIG. 9 illustrates an image capture simulation for a system 901, where a line of transmitting image points are reflected from a surface $f(x)=0.04e^{-0.1(x-4)^2}$. Using a simulated captured image containing a line of received image points, a reconstructed estimate g(x) of the surface shown as reconstructed surface 902 can be determined. A deviation from the original (i.e., f(x)−g(x)) shown as error 903 can be calculated that shows that the reconstructed surface g(x) is never more than 1 um away from the original surface f(x). This error difference from the surface estimation can be less than other sources of error in the measurement system, thus the accuracy of the method proposed can suffice. Additional simulations can show that the reconstruction error can increase as the peak of the surface ƒ(x) becomes sharper and can decrease as the number of captured image points increases.

Figure 10B:
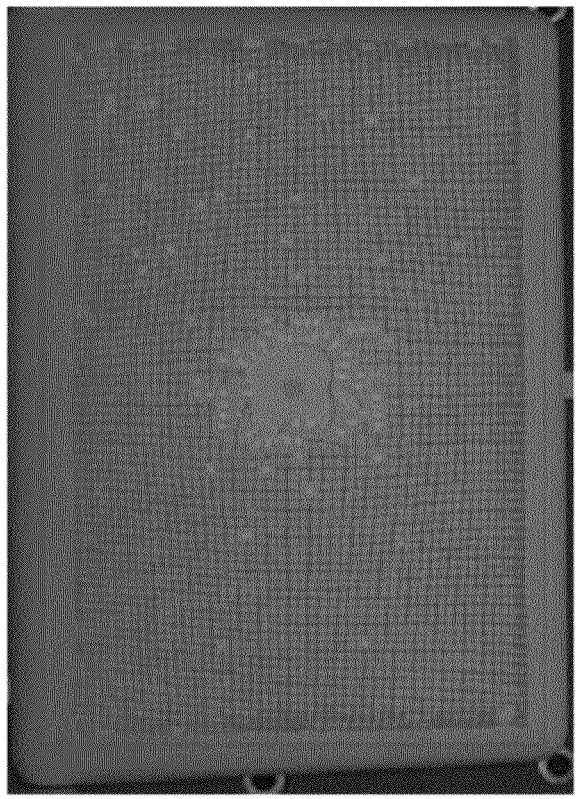
FIGS. 10A and 10B illustrate an estimation of a reflected image pattern.
Figure 10A:
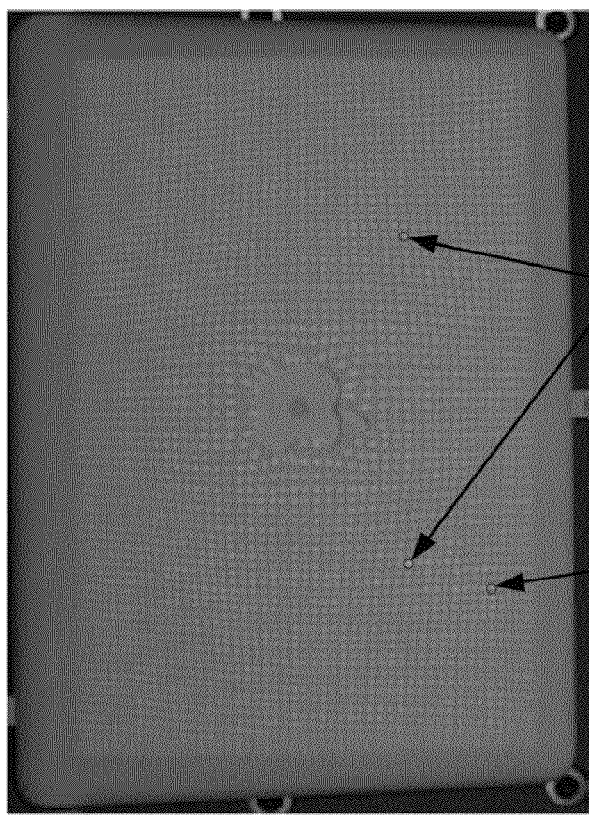

The method described above for estimating a reflective surface (curve) f(x) in two dimensions can be extended analogously to three dimensions. Instead of tangent lines to a reflective curve, one can have tangent planes to a reflective surface. The unit normal vector n can be perpendicular to the tangent plane at a reflection point q on the reflective surface. FIG. 10A illustrates a captured image reflection 1001 of an array of image points (dot grid) reflected from a surface of a glossy plastic electronics enclosure. Each reflected dot 1002 can correspond to a transmitted dot projected from an image display (for example one or more adjacent "lit" pixels of a flat panel display). One or more reference dots 1003 can be included in the projected image that can be used to calibrate the system. These reference dots can use a different color to distinguish them from the other dots in the projected image. FIG. 10B illustrates a set of located dots 1004 extracted from the captured reflected image 1001, each dot connected by line segments to adjacent neighboring located dots. A three dimensional surface estimate can be constructed using the coordinate locations of the dots and their adjacency information.

Figure 10C:
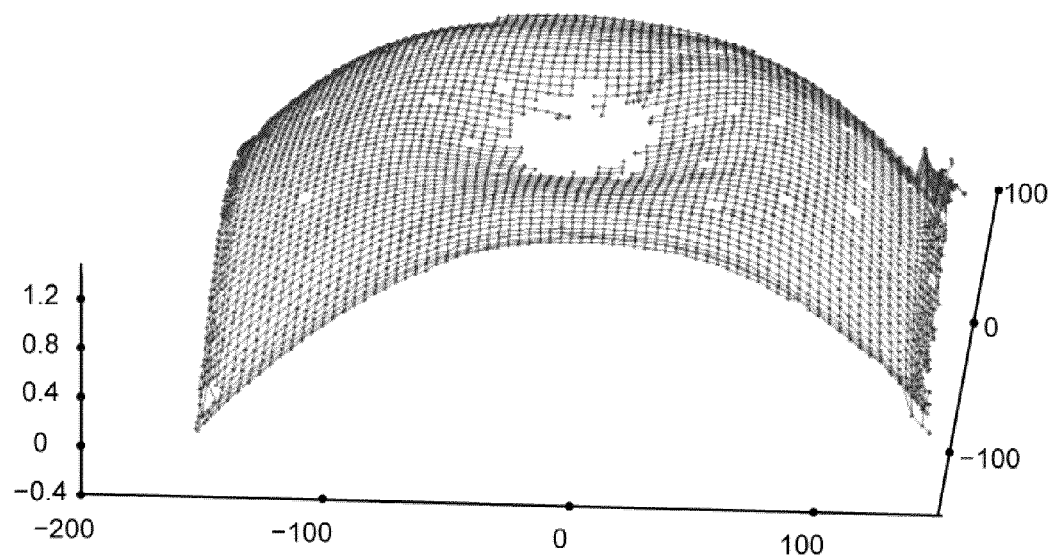
FIGS. 10C and 10D illustrate a three dimensional surface estimate of the reflected image pattern of FIG. 10A.
Figure 10D:
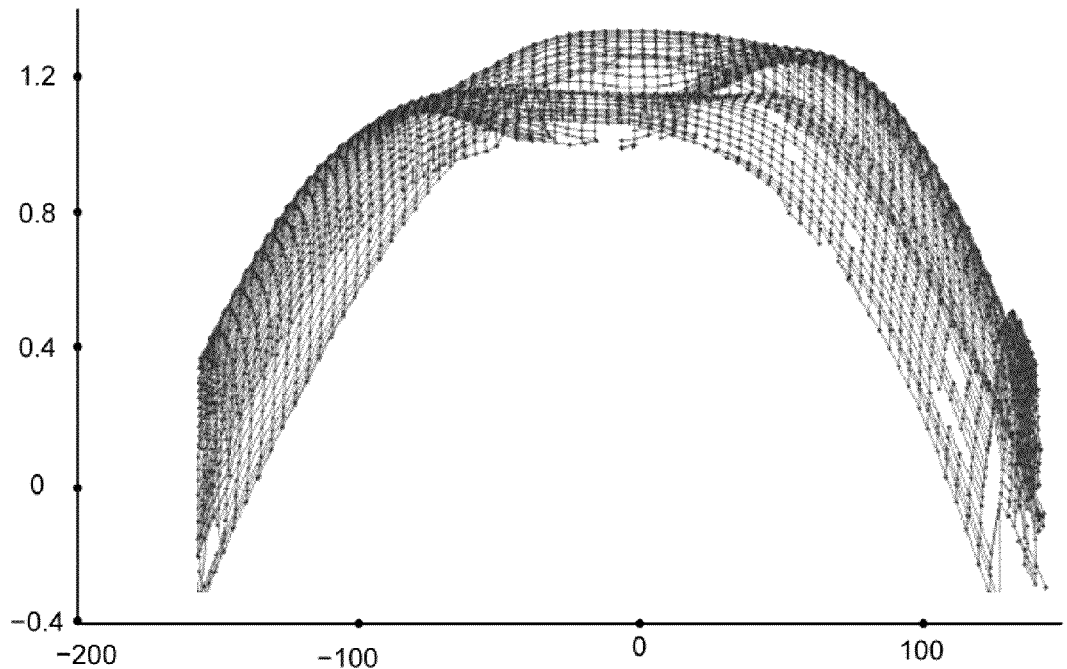
Figure 10E:
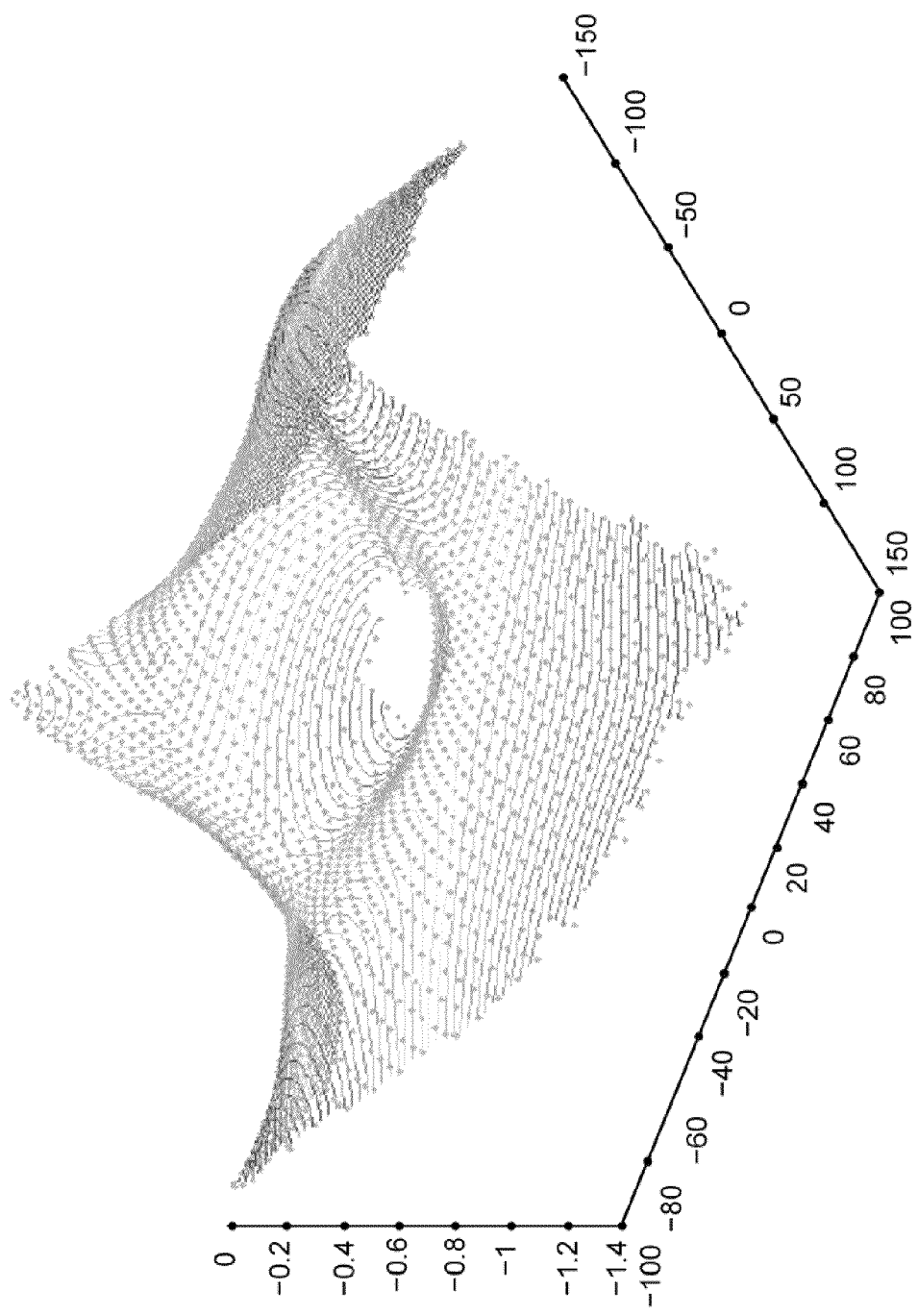
FIG. 10E illustrates the three dimensional surface estimate of FIG. 10C including surface contours.
Figure 10F:
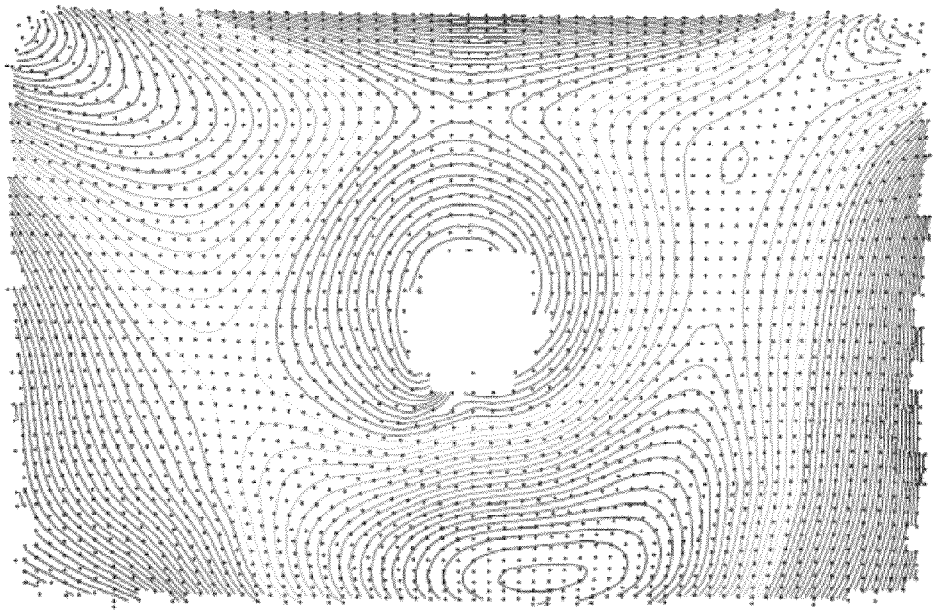
FIG. 10F illustrates a surface contour map of the three dimensional surface estimate of FIG. 10E generated using an embodiment of the invention.
Figure 10G:
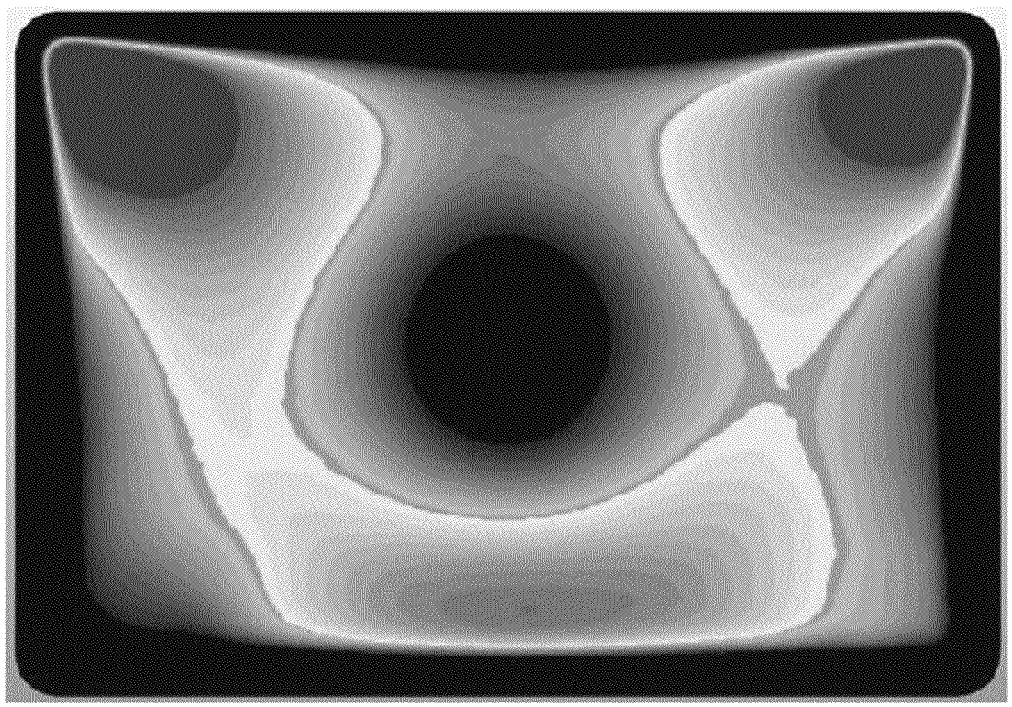
FIG. 10G illustrates a surface contour map using a prior art laser measurement system.

Given a three dimensional location a of a first dot, one can determine the three dimensional location b of a second neighboring dot by using the two dimensional iterative solution described above for FIGS. 6 and 7. Consider the two dimensional plane P defined by the point a and a line through b (i.e. a light ray reflected from b) to an image capture device (camera). Starting with the three dimensional location a and hence the orientation of the surface through the location a (which defines the slope of the surface through the location a in the two dimensional plane P), one can estimate a three dimensional location b. For the same light ray corresponding to a particular image point in the captured reflected image, one can construct an estimate for b starting from each of multiple adjacent neighboring points for which one has already estimated a location and surface orientation. Thus one can average several estimates for the location b using several different starting points a to improve accuracy. Each starting point a defines a different plane together with the light ray through the point b. In one embodiment of the invention using a regular grid of image points, a new estimated point location can be added to the surface estimate by averaging the three dimensional locations calculated by starting at its eight nearest neighbors. (Only neighboring points that are already part of the surface estimate can be used as a starting point.) FIGS. 10C and 10D illustrate two views of a constructed three dimensional surface estimate using the method described. FIG. 10E provides another view in which the adjacency connections between image points are removed and equidistant contours (in the z direction) are drawn. Adjacent contour lines differ by 20 microns in FIG. 10E. FIG. 10F illustrates the contour map of FIG. 10E viewed from above. Contour maps can provide a consistent means to compare surface estimates generated from captured images of multiple samples of a manufactured part. The units for the axes in FIGS. 10C, 10D, 10E and 10F are given in mm. Using a single image capture, a three dimensional surface estimate can be calculated in a few seconds compared with the minutes or longer the would be required by prior art methods. The accuracy of the method can be empirically confirmed by comparing the contour map of FIG. 10F to a surface deformation measurement of the same part illustrated in FIG. 10G performed using a prior art laser scanning device. As shown in FIG. 10G, the contour map of the estimated surface correlates well to the laser scan.

Figure 11:
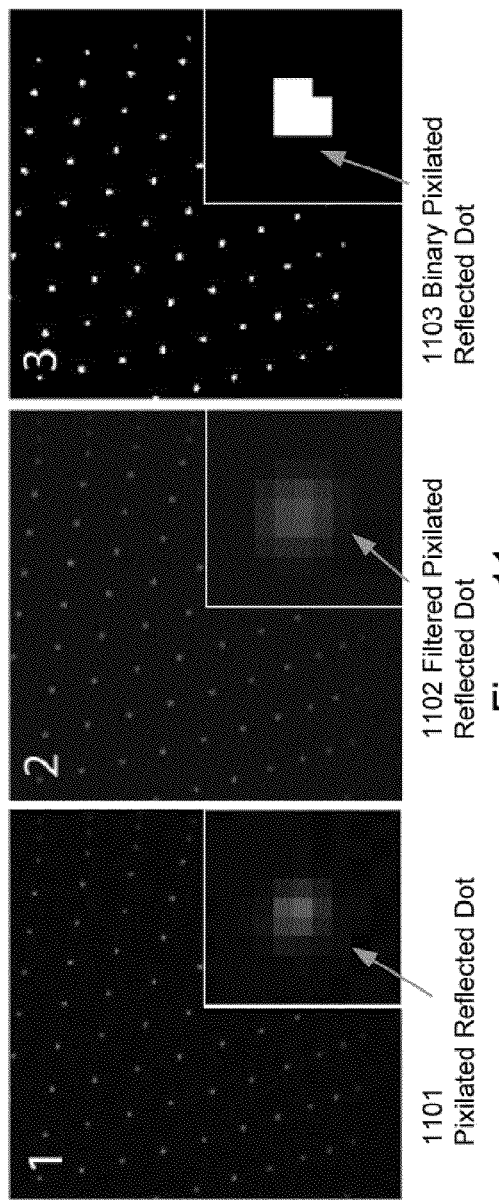
FIG. 11 illustrates image processing on a pixilated captured image.

As described above, a three dimensional surface of a specular reflective object can be estimated using a two-dimensional image capture of a projected image reflection. The projected image can include a regular pattern, such as an array of dots. These dots can be located in the captured image as described next. Each projected dot will correspond to a cluster of pixels (pixilated reflected dot 1101) in a digital captured image as shown in FIG. 11. Note that for the purpose of locating the dots, the captured image illustrated in FIG. 11 has been reduced to a monochrome image, which can be derived from one or more color (red, green, blue) channels in the captured color image generated by a digital still camera. In a digital still camera with a Bayer array of pixels, the green channel can provide the most information and thus can be preferred. Using an array of numbers, each number representing a value for the green channel in a captured image, we can create a smoothed image by low pass filtering each pixel. For example, we can average the values for each pixel using the values of its surrounding (nearest neighbor) pixels. A filtered pixilated reflected dot 1102 is shown after low pass filtering the pixilated reflected dot 1101 in FIG. 11. Note that the filtered pixilated reflected dot 1102 contains more pixels with a lower peak value than the captured pixilated reflected dot 1101. Each value for a pixel in the filtered image can then be converted to a binary value (i.e. black or white only) depending upon a threshold resulting in a binary pixilated reflected dot 1103. The low pass filtering (smoothing) operation ensures that dots do not split into multiple pixel clusters after the threshold operation. Alternatively one can exclude the low pass filtering operation and directly generate a binary pixilated image from the captured monochrome image (possibly resulting in multiple distinct "white" pixels for each pixel cluster corresponding to a single reflected dot). The resulting binary pixilated image can be transformed by expanding each "white" pixel into a 3×3 (or some other pattern) of "white" pixels, thereby "dilating" each pixel into a larger cluster of pixels. Using either method, the resulting binary pixilated image preferably contains a distinct, undivided cluster of "white" pixels corresponding to each captured reflected dot.

Figure 12:
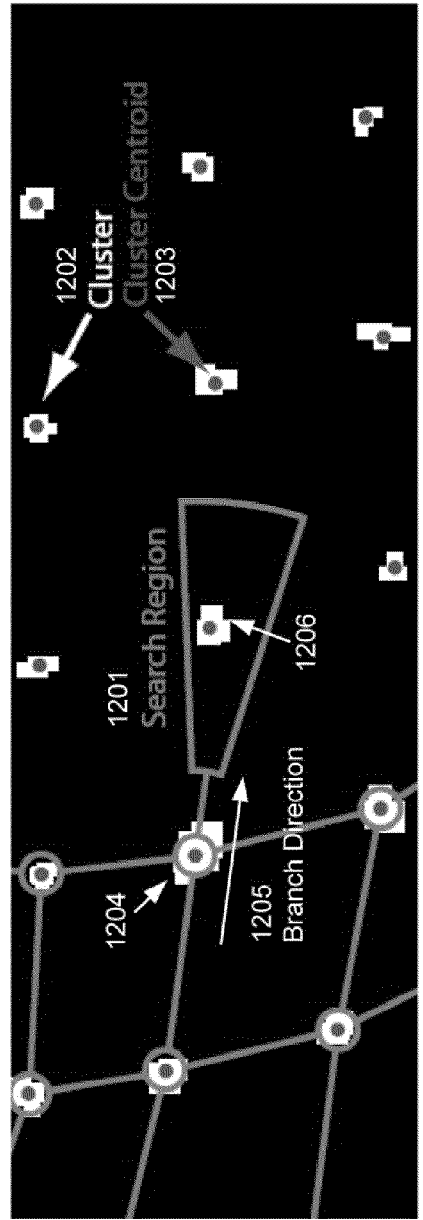
FIG. 12 illustrates elements used to estimate an image pattern.

A two dimensional geometric location for each dot can be determined from the binary pixilated image as the centroid of each cluster of "white" pixels. FIG. 12 illustrates a cluster of pixels 1202 and a cluster centroid 1203 of a neighboring cluster of pixels. One method to identify all pixels in each cluster can be to assign an integer to each "white" pixel in the image. This can be done by working through the image pixels one by one. If a new pixel is white, and has no neighboring pixels that are white, the pixel can be assigned a new integer. If the new white pixel has neighboring white pixels that are already labeled, the new pixel can be assigned the minimum of the integers assigned to its labeled white neighbors. After a first pass, some of the pixels in the same cluster can have been assigned different integers, but this multiple assignment can be fixed by a second pass. Having identified the pixels comprising each cluster, the centroids of the pixel clusters can be computed. Next, one can determine the generating dot corresponding to each pixel cluster centroid. This correspondence can be determined by branching out from one or more reference dots, which can be identified (before monochrome and binary conversion) uniquely based on a different captured color from the remaining dots in the projected image (e.g. the reference dots can be colored blue instead of white). A neighboring centroid can be connected to an existing identified centroid by searching in an annular region defined (when possible) along the direction of branches already established. FIG. 12 shows one possible annular search region 1201 that extends along a branch direction 1205 from a centroid 1204 and identifies a neighboring centroid 1206. Using the calculated centroids and the relationship among them, one can then estimate the surface shape of a reflective object that "distorts" the projected image pattern as described above.

Accuracy of the surface shape estimate can depend on the spacing between dots in the projected image pattern. More closely spaced dots can provide more information about the surface shape; however, the curvature of the surface across some areas of the reflective object can cause adjacent projected dots in the projected image to be very close together in the reflected image. In FIG. 10A the dots near the edge of the reflected image 1001 appear to nearly merge together, and the corresponding located dot pattern 1004 shown in FIG. 10B contains some holes near the edge where dots could not be located. Accuracy in certain regions of the surface can be improved by changing the density of the dot grid (or the size of each dot) to ensure distinguishable (but still closely spaced) dots. In addition one can also change the position of the image capture device or the orientation of the reflective object to provide a different angle of view. One can also change the magnification of the field of view by altering the focal length of the camera lens to capture a specific region of the specular reflective object. A composite estimate of the specular reflective surface can then be assembled from multiple images captured using different projected image patterns, different spatial orientations, or different fields of view or any combination thereof.

Figure 14:
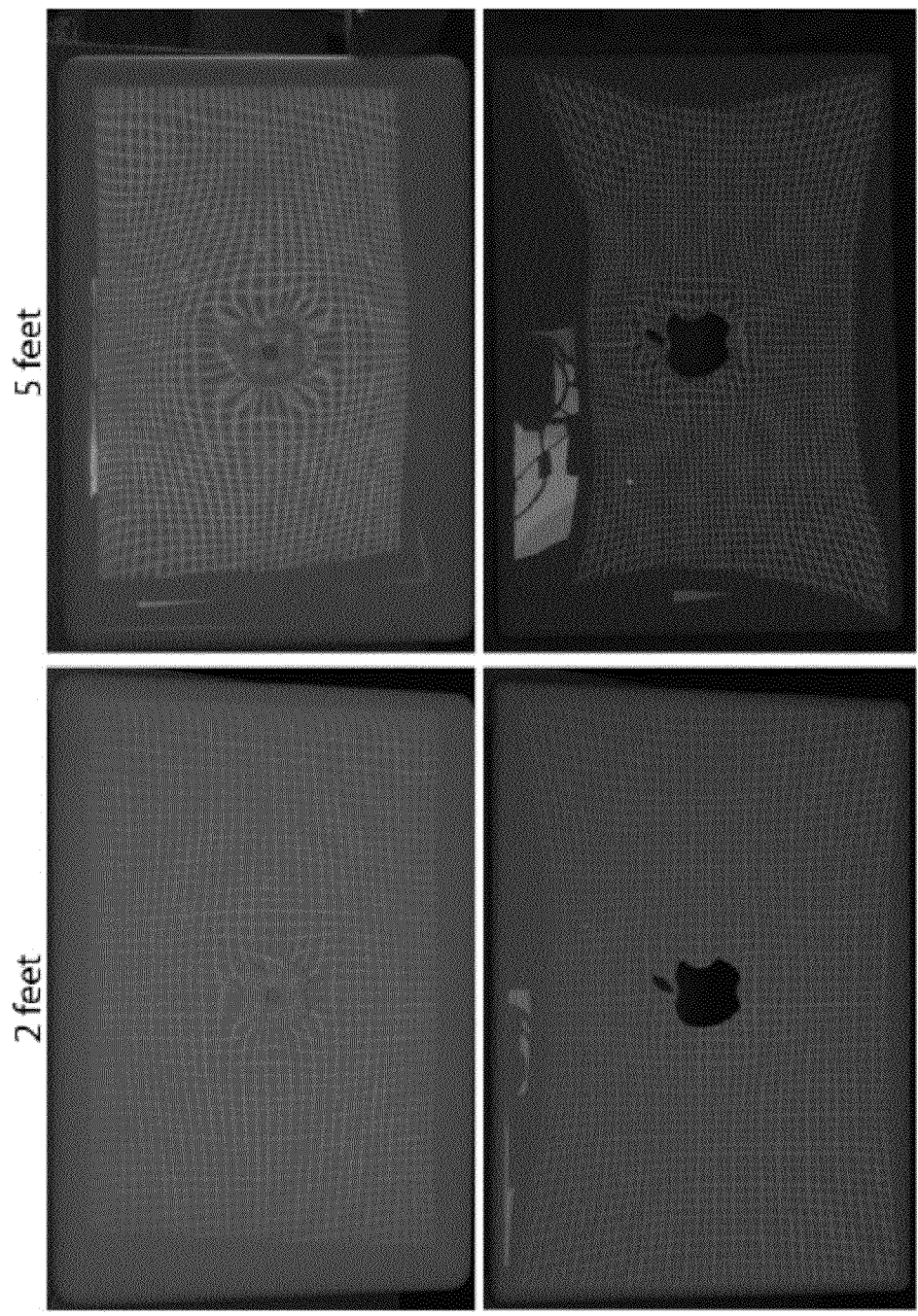
FIG. 14 illustrates distortion variations for reflected images.

FIG. 13A illustrates a captured image of a dot grid reflected from a second enclosure, and FIG. 13B shows the dots identified and some of the adjacency (connection) information assembled. A three dimensional surface estimate of the part is illustrated is FIG. 13D including concentric contour rings. FIG. 13C illustrates a resulting contour map of the estimated surface viewed from above. The method described can provide accurate results for even small variations in the shape of the reflective surface. The distortion in the projected image can increase as one increases the distance between the display, the image capture devices and the reflective object. FIG. 14 illustrates captured images for two different reflective objects, each reflective object placed at two different distances from the display and image capture devices. A regular grid of lines is projected onto a first case 1401 and onto a second case 1402 from a two foot distance and also from a five foot distance. The five foot distance reflected images show greater distortion.

Figure 15:
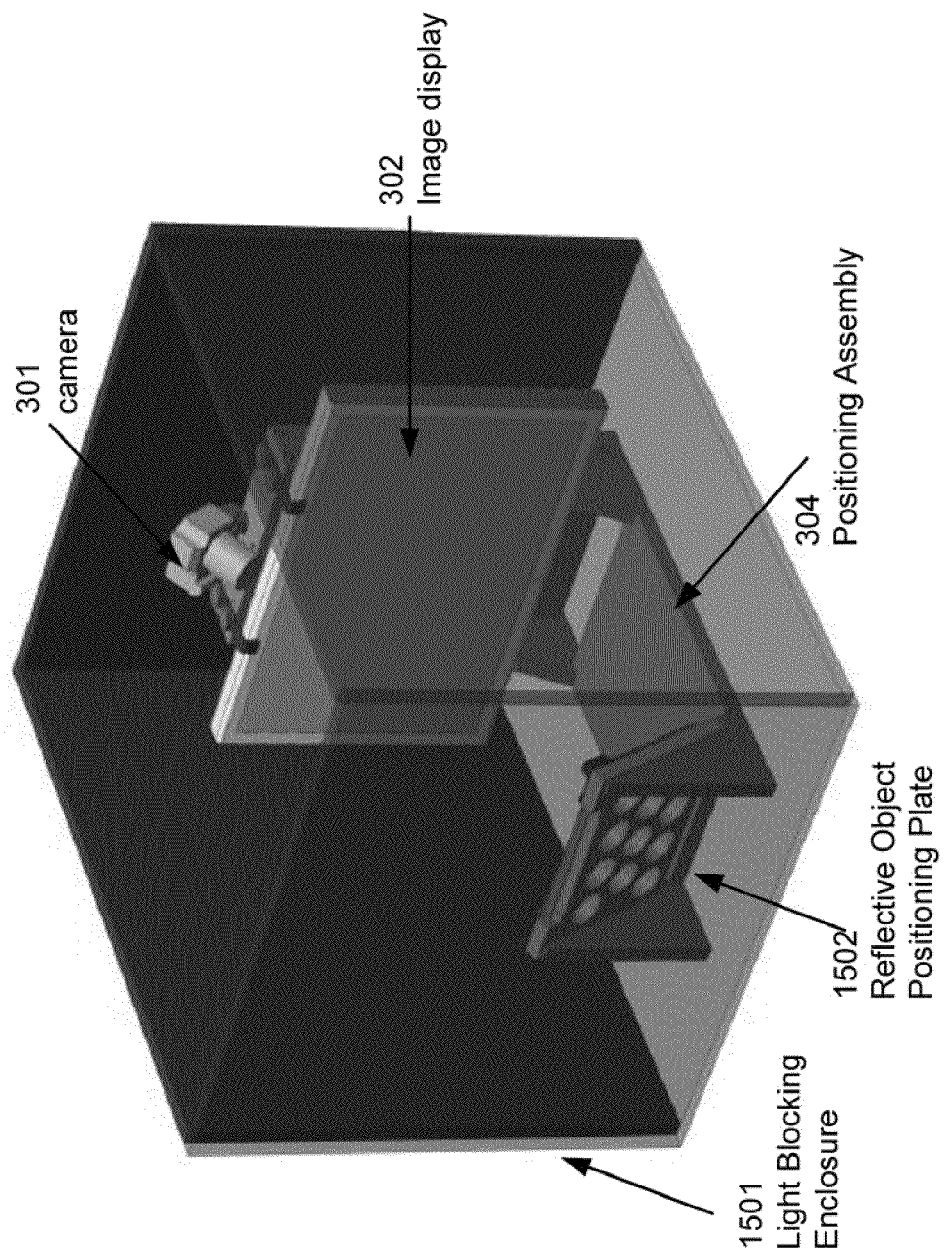
FIG. 15 illustrates a computer aided design model for a system to estimate the shape of a reflective object.

FIG. 15 illustrates a computer aided design diagram of a system for capturing images to estimate a surface shape of a reflective object. An image capture device (camera) 301 and an image display device (302) are mounted on a positioning assembly 304 which includes a positioning plate 1502 on which the reflective object can be oriented. A light blocking enclosure 1501 can reduce extraneous light from the ambient environment to improve the quality of an image projected by the image display 302 and captured by the camera 301.

Figure 16:
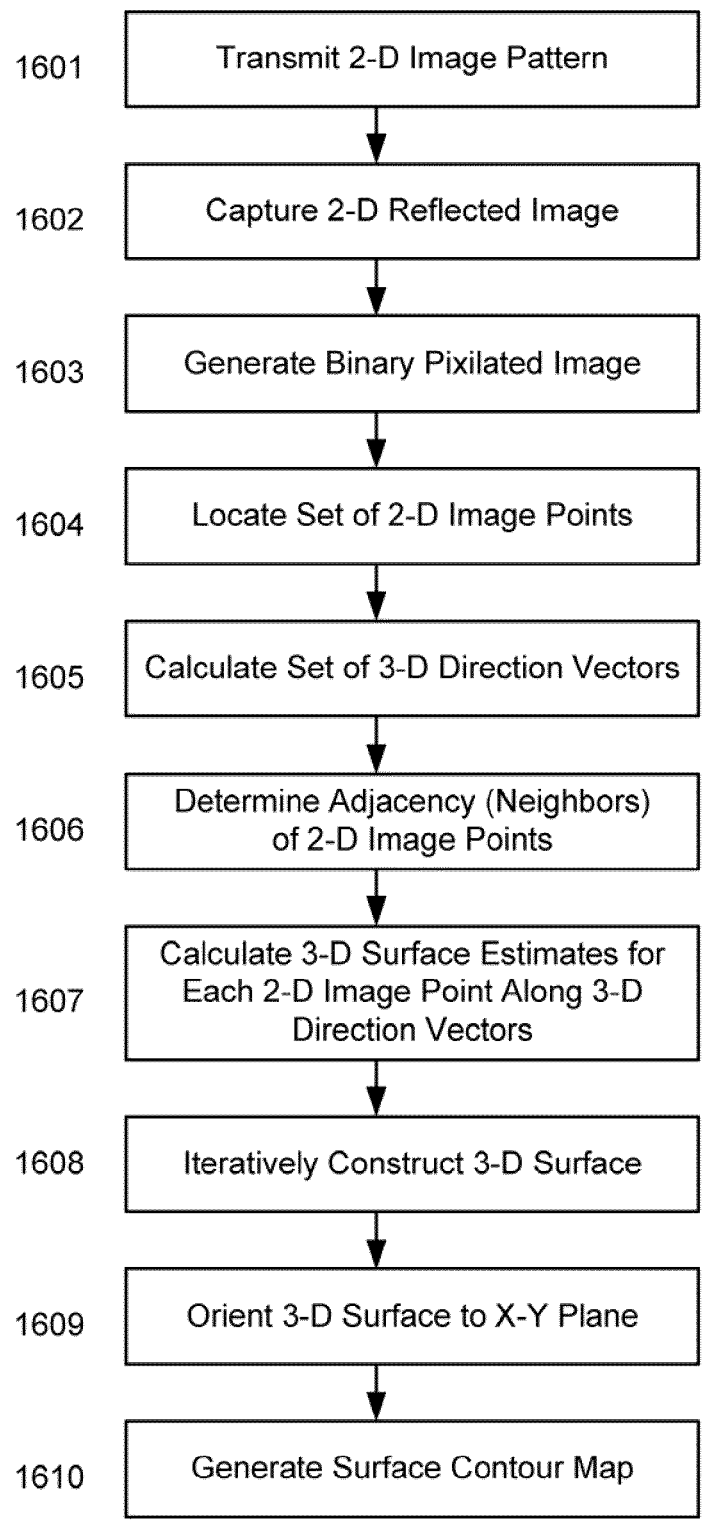
FIG. 16 outlines a method to generate a surface estimate of a reflective object.
Figure 17:
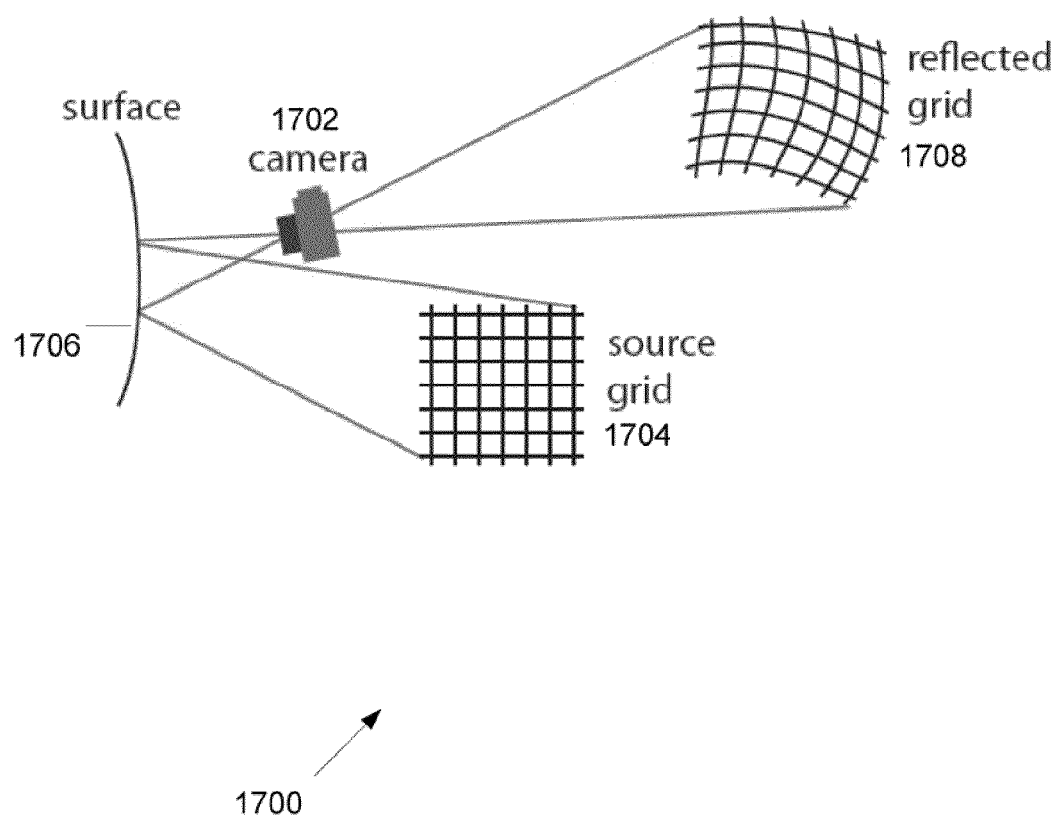
FIGS. 17-21 illustrate embodiments suitable for using grid patterns to evaluate surface quality of a part under evaluation in accordance with the described embodiments.

FIG. 16 outlines a method to estimate a reflective surface shape. In step 1601 an image display device can transmit a two-dimensional image pattern toward a specular reflective object. This pattern can be a regular array of dots, lines, squares or other shapes with distinctly identifiable points. Preferably the image uses an array of light and dark regions with sharp edges. For example an image can include a plurality of light dots separated on a dark background, each dot being distinctly identifiable. In another embodiment the image can include a plurality of light lines arranged in a grid pattern on a dark background; where the lines intersect can be an identifiable point. In yet another embodiment the image can include a checkerboard pattern of light and dark squares where the four corners of four adjacent squares meet forming an identifiable point. Many different image patterns can be used by the method described herein, and the method is not limited to the exemplary image pattern described.

In step 1602 an image capture device captures a two-dimensional image of a reflection of the projected image. In a preferred embodiment, the image capture device is a digital still camera that can generate a digital pixilated image. The reflected image can contain a distorted version of the projected image, wherein the distortions can be caused by variations in the surface shape of the specular reflective object. In step 1603 a binary pixilated image can be generated from the captured pixilated two-dimensional reflected image. Preferably the binary pixilated image includes an array of pixel clusters, each pixel cluster corresponding to an individual identifiable point in the projected image. In step 1604 a set of two-dimensional image points can be identified and located using the binary pixilated image. Preferably each pixel cluster in the binary pixilated image generates a unique two-dimensional image point. In a preferred embodiment, the two-dimensional image point is a centroid of the pixel cluster. In step 1605, a set of three-dimensional direction vectors are calculated, one for each two-dimensional image point. Each three-dimensional vector can represent the direction that a light ray travels from a reflection point on the surface of the specular reflective object to the image plane of the image capture device for a respective two-dimensional image point. In step 1606 adjacency information can be determined for each of the two-dimensional image points relating each point to its neighboring points. In step 1607 a set of three-dimensional surface estimates can be calculated for each two-dimensional image point along its corresponding three-dimensional direction vector. Each element of the set of three-dimensional surface estimates can represent a different position and orientation of the reflective object's surface from which the two-dimensional image point can be reflected into the image capture device. In step 1608 a three-dimensional surface estimate of the reflective object can be iteratively constructed starting with one or more reference points of the surface. For each three-dimensional surface estimate, an element of a set of three-dimensional surface estimates for a two-dimensional image point can be chosen that minimizes a curvature function of a curve connecting the three-dimensional surface estimate to a previously estimated three dimensional surface estimate. In a preferred embodiment the curve includes a cubic polynomial function. In step 1609 the three-dimensional surface estimate can be oriented with respect to a reference plane. In step 1610 a surface contour map can be generated from the oriented three-dimensional surface estimate.

In addition to reconstruction of a surface in three dimensions, the described embodiments can also teach various techniques related to use of a regular pattern, such as a grid, for evaluating surface distortions. For example, as shown in FIG.

17, system 1700 that can include camera 1702 and a projector (not shown) that can be used to project source pattern 1704 onto surface 1706. It should be noted that the projector can be any suitable light source capable of projecting light of sufficient intensity onto surface 1706. For example, the projector can be a display screen onto which a pattern can be either overlaid or generated for projection onto surface 1706. Source pattern 1704 can be a pattern formed of repeating geometric shapes having a specific pattern density. For example, source pattern 1704 can be a square or rectangle pattern having a pattern density of about 20 pixels per square. Source pattern 1704 can be projected onto surface 1706 from the projector. In the described embodiment, any corrections in the projected image due to the fixturing of system 1700 can be corrected by, for example, skewing a horizontal axis of the projected image of source pattern 1704. Camera 1702 can be positioned to capture substantially all of the image projected on and reflected from surface 1706 (it should be noted that surface 1706 typically represents a portion, either whole or in part, of a part or a device under evaluation). Typically, reflected image 1708 captured by camera 1702 can undergo post capture processing. Such post capture processing can include any number of well known processing techniques suitable for to enhancing the image and or to retain the original proportions of surface 1706. The post capture processing can include at least the following operations. The captured image can processed to correct for any distortions created by system 1700. For example, the image can be transformed along a horizontal axis to correct for any angles present in system 1700. Furthermore, the image can be scaled along a vertical axis to recover any original device proportions. The colorspace of the image can also be inverted as well as enhancing image contrast. Once the image has been properly post capture processed, the processed image can be displayed.

Figure 18:
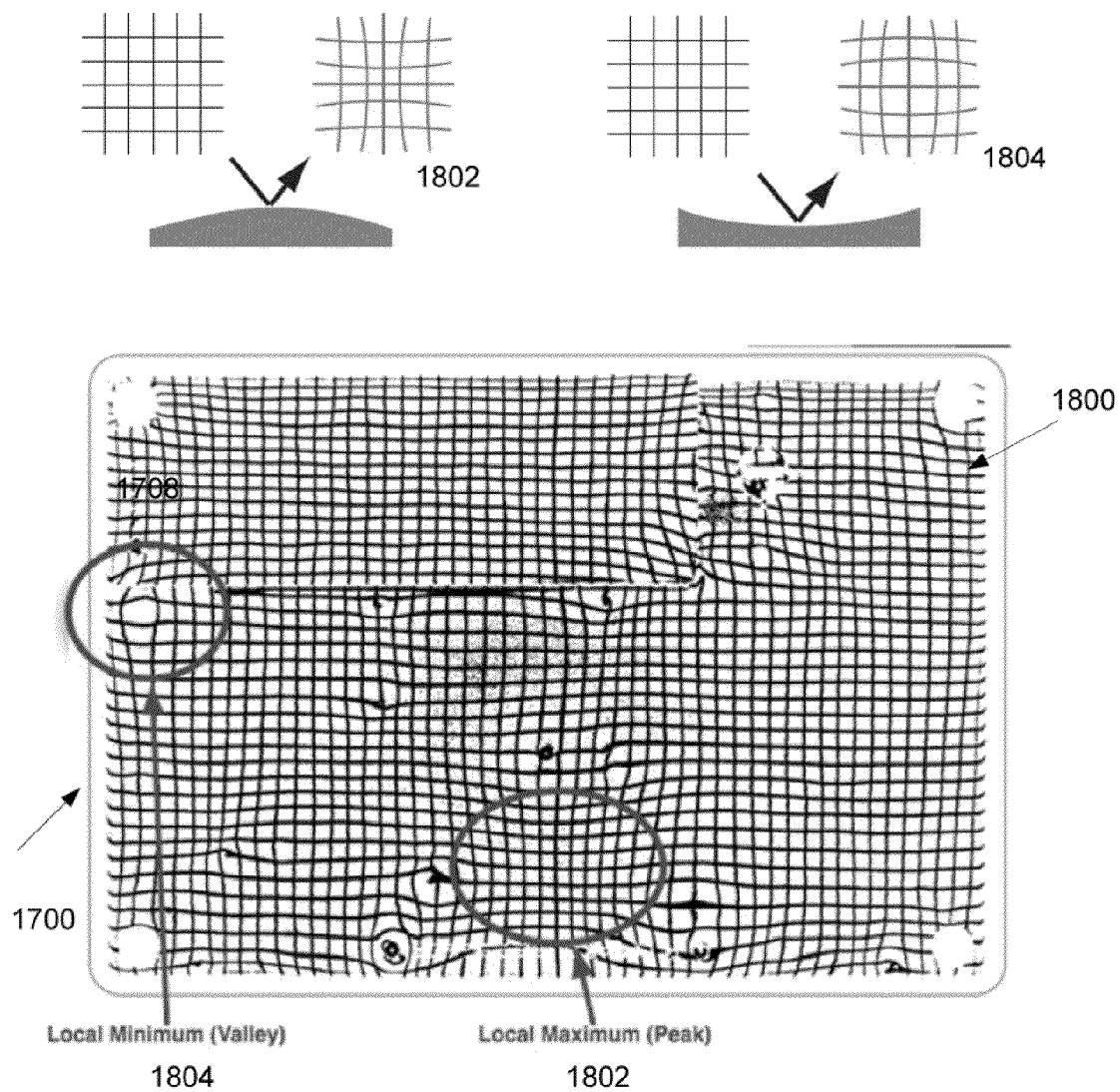

As shown in FIG. 18, displayed image 1800 can be used to evaluate any imperfections or distortions present in surface 1706. For example, region 1802 of tightly packed (convex) rectangles can indicate a local area of maximum surface curvature (i.e., a peak) of surface 1706 whereas region 1804 of (concave) rectangles can indicate a local area of minimum surface curvature (i.e., a valley). It should be noted that any image processing can be carried out in real time and can provide qualitative information about any relative distortions present on surface 1706. This information can be valuable to those (such as a process engineer) evaluating the device. In particular, affording the process engineer a rapid and inexpensive way to iterate on and improve a manufacturing process. For example, an number of fast grid comparisons can be taken from which a rapid evaluation can be carried out whether or not the process has been improved.

Figure 19:
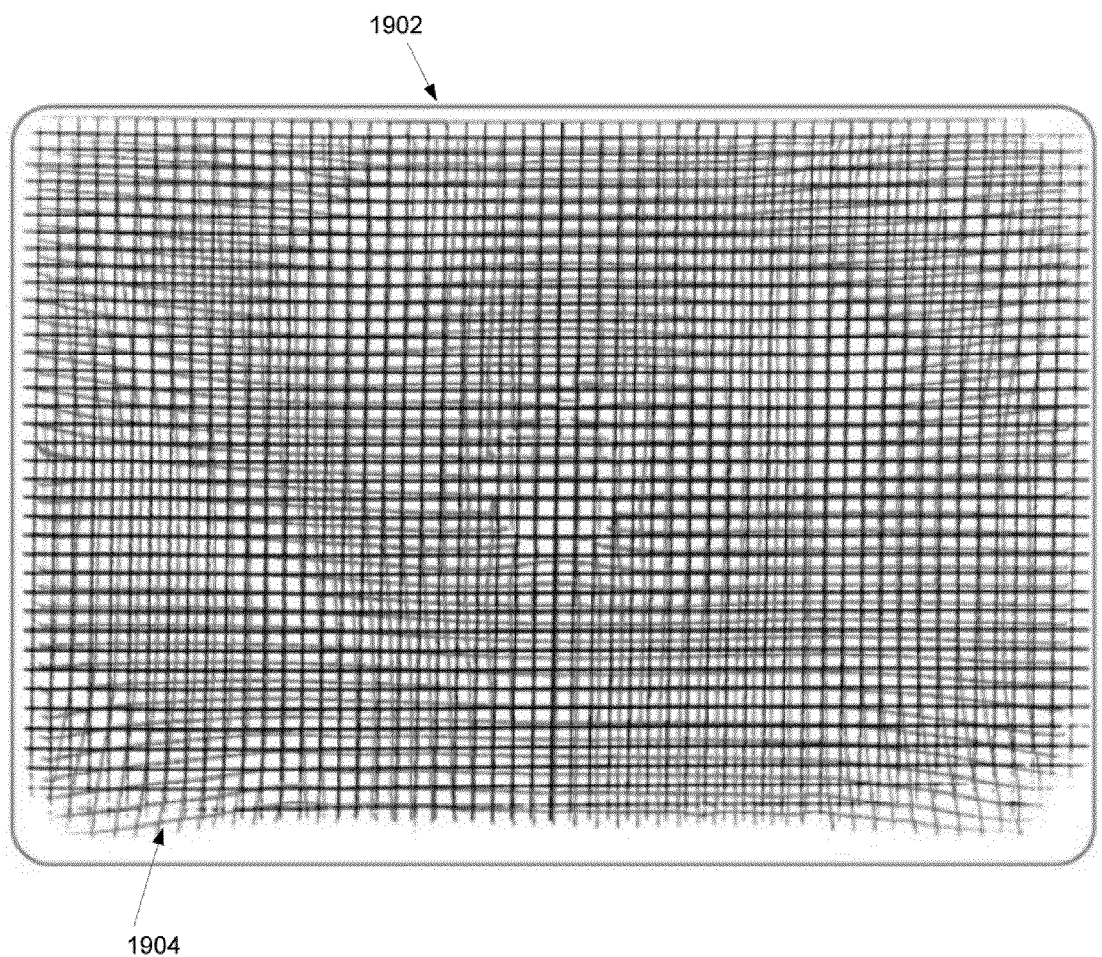
Figure 20:
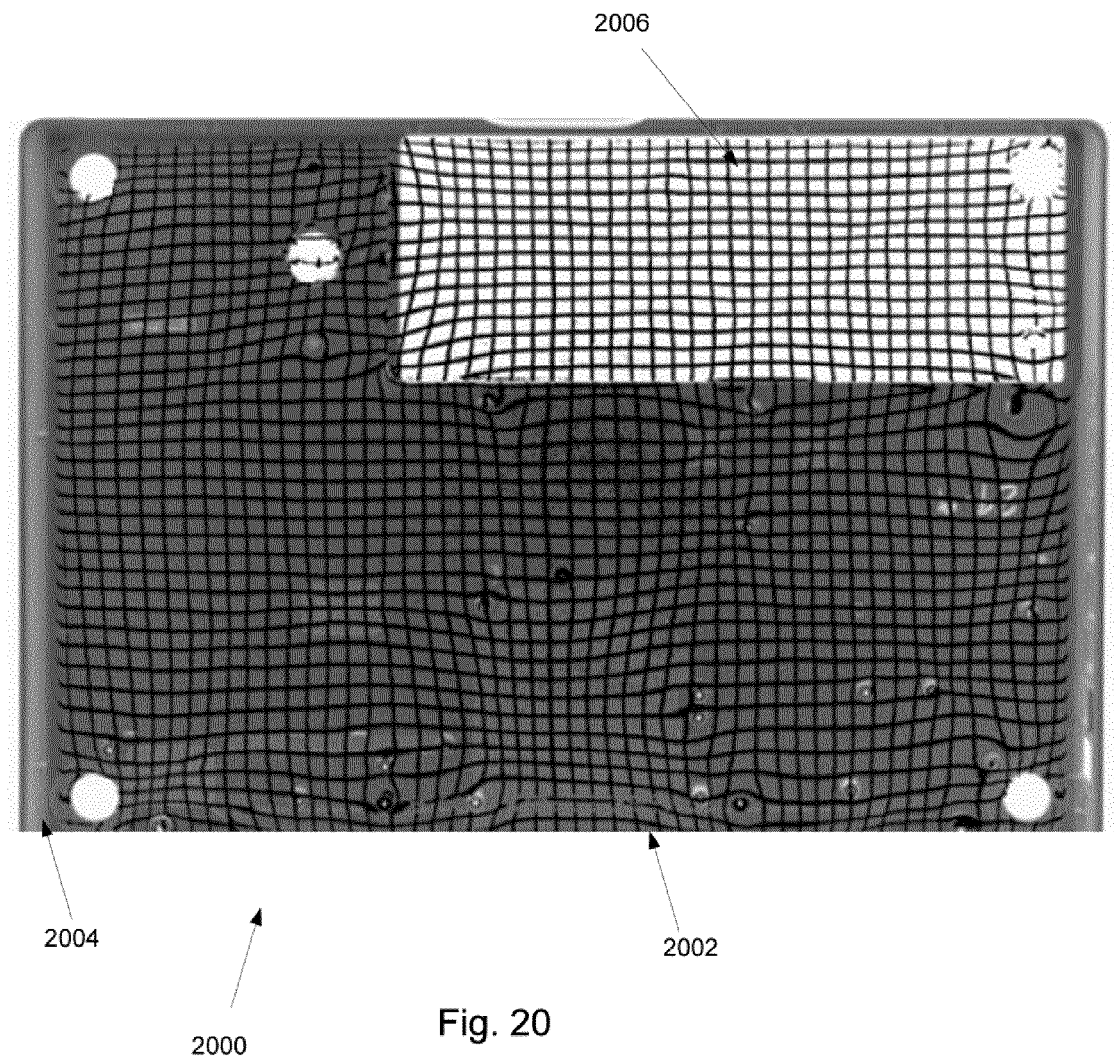

This procedure can be further extended by overlaying the various grid patterns on atop the other using, for example, industry standard alpha compositing. For example, FIG. 19 shows system 1900 having (relatively) flat surface (such as acrylic plastic) 1902 used to capture calibration image 1904. When a portion of the captured image 1906 is overlaid atop calibration image 1904, any deviations D from normal can be easily seen. FIG. 20 shows system 2000 where first image 2002 of the grid pattern can be projected onto a user visible (i.e., the cosmetic portion) surface of device 2004 (or part) under evaluation. Second image 2006 of an opposite, inside surface of part 2004 can be captured having no overlaid grid pattern. In the described embodiment, one of the two images can be flipped and overlaid onto the other image. For example, first image 2002 can be flipped and overlaid onto second image 2006 along their respective horizontal axes. In this way, the effects of various design features such as bosses, holes, edges, etc. can be evaluated.

Figure 21:
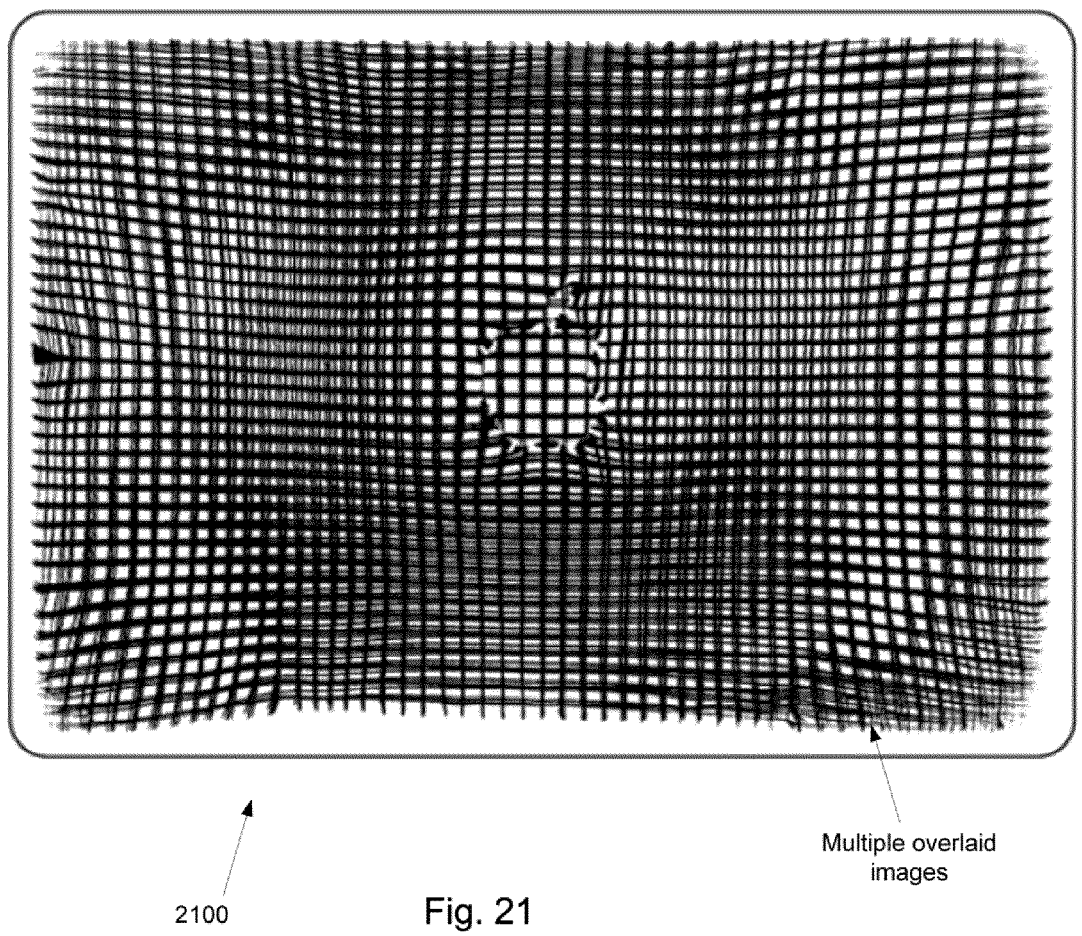

In yet another technique shown in FIG. 21, shows system 2100 where a number of capture images from a number, or series, of parts can be overlaid one atop the other using alpha values. As subsequent parts are added and overlaid, any part that deviates from an average will quickly be evident to an observer. In addition, the composition of multiple parts can illuminate regions where rectangles are well defined (indicating little or no part variation) as well as regions having ill or poorly defined rectangles (indicating an area of large part to part variation).

Figure 22:
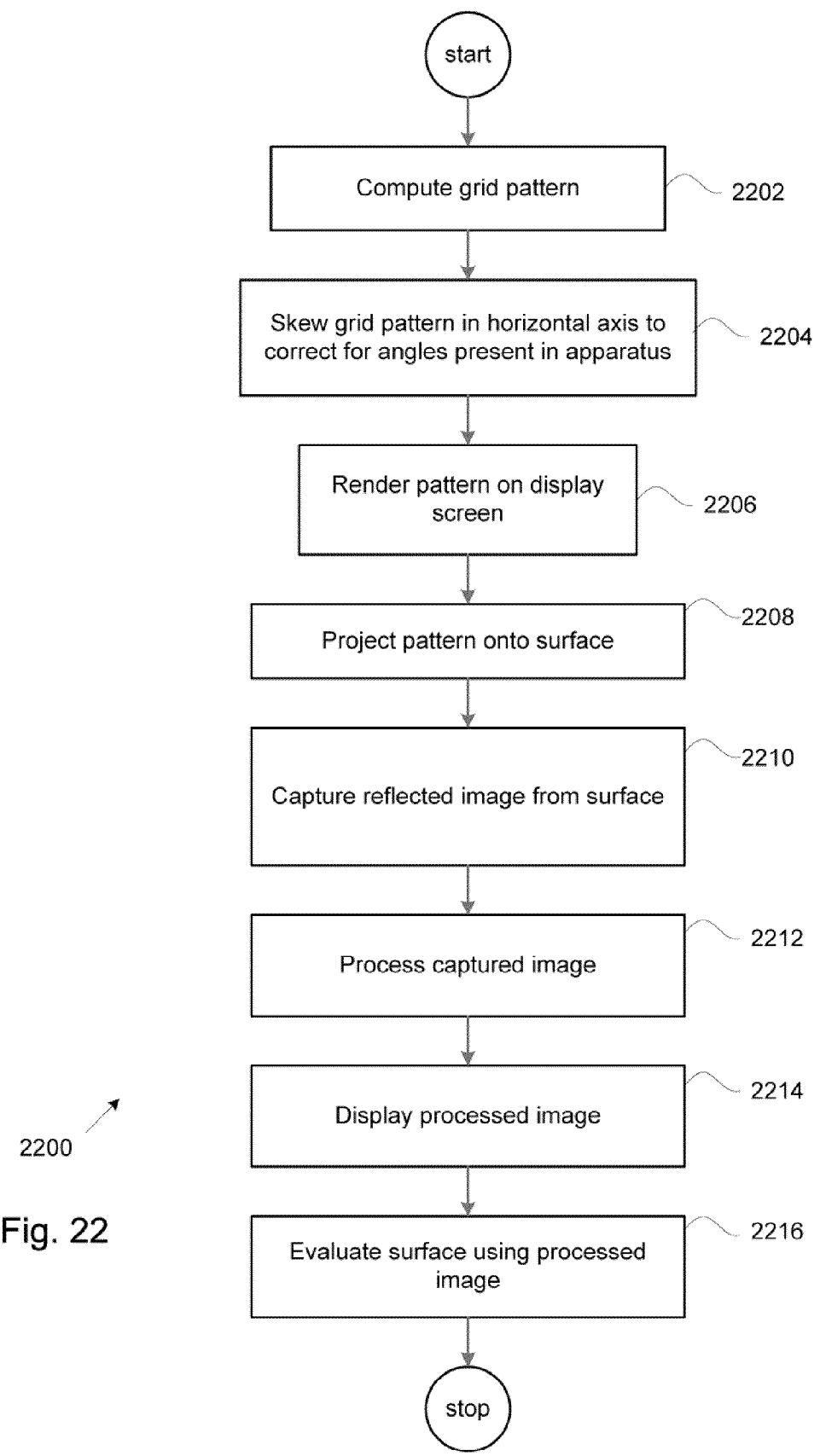
FIG. 22 shows a flowchart detailing a process in accordance with a described embodiment.

FIG. 22 shows a flowchart detailing process 2200 in accordance with the described embodiments. Process 2200 can be used for evaluating a surface of a device or part in a fast and inexpensive manner well suited for a timely analysis of a process or other manufacturing operation. Process 2200 can be carried out by performing at least the following operations. At 2202, a grid, or source, pattern can be computed. The grid pattern can be formed of an array or repeating regular shapes such as rectangles or squares and have a well defined pattern density. At 2204, the grid pattern can be skewed along a horizontal (or vertical) axis in order to correct for any angles present in the apparatus distorting the grid pattern. Next at 2206, the grid pattern can be rendered on a display screen or other light projecting device. The grid pattern is than projected onto a surface of the device or part under evaluation at 2208. The projected image can be reflected from the surface and captured at 2210 and processed at 2212. The processed image can be displayed at 2214 and used to evaluate a surface quality of the part at 2216.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method for estimating a three-dimensional surface shape of an object having a specular reflective surface, the method comprising:
projecting an image pattern on the specular reflective surface;
capturing a reflected image pattern from the specular reflective surface by an image capture device;
comparing a set of two-dimensional reflected image points in the reflected image pattern to the projected image pattern to generate an estimate of the three-dimensional surface shape of the reflective object; and
displaying the estimate of the three-dimensional surface shape of the reflective object,
wherein comparing the set of two-dimensional reflected image points in the reflected image pattern to the projected image pattern to generate the estimate of the three dimensional surface shape of the reflective object comprises:

generating from the reflected image pattern a binary pixilated image comprising a set of binary pixels, each binary pixel representing a portion of the reflected image pattern, calculating the set of two-dimensional reflected image points from the binary pixilated image, each two-dimensional reflected image point corresponding to a two-dimensional transmitted image point in the projected image pattern and corresponding to a three-dimensional point on the surface of the object, determining a set of three-dimensional vectors, each vector associated with one of the two-dimensional reflected image points and representing a direction from the corresponding three-dimensional point on the surface of the object to the image capture device, and generating the estimate of the three-dimensional surface shape of the reflective object from the set of three-dimensional vectors and a set of the two-dimensional transmitted image points in the transmitted image pattern.

2. The method of claim 1 wherein the projected image pattern comprises a regularly spaced array of light regions and dark regions.

3. The method of claim 1 wherein the projected image pattern comprises a grid of dots, each dot formed using at least one pixel of a pixilated display device and separated from adjacent dots by a region of one or more pixels having a substantially different transmitted luminance.

4. The method of claim 1 wherein the reflected image pattern comprises a digital pixilated image captured by a digital camera and generating the binary pixilated image comprises:

generating a monochromatic digital pixilated image from the digital pixilated image, each pixel in the monochromatic digital pixilated image having a received luminance value;

modifying the received luminance values of the monochromatic digital pixilated image using a two-dimensional smoothing function;

reducing the monochromatic digital pixilated image to the binary pixilated image by setting a value of each pixel in the monochromatic digital pixilated image to a first number if the luminance value of the pixel exceeds a threshold value and to a second number otherwise.

5. The method of claim 4 wherein calculating the set of two-dimensional reflected image points from the binary pixilated image comprises:

identifying a set of pixel clusters, each pixel in a pixel cluster having a value equal to the first number and each pixel adjacent to the pixel cluster having a value equal to the second number, wherein each pixel cluster corresponds to a dot in the grid of dots projected by the light transmitting device; and calculating each point in the set of two-dimensional reflected image points as the two- dimensional geometric centroid of one of the pixel clusters.

6. A method for estimating a three-dimensional surface shape of an object having a specular reflective surface, the method comprising:

projecting an image pattern on the specular reflective surface;

capturing a reflected image pattern from the specular reflective surface by an image capture device;

comparing a set of two-dimensional reflected image points in the reflected image pattern to the projected image pattern to generate an estimate of the three-dimensional surface shape of the reflective object; and displaying the estimate of the three-dimensional surface shape of the reflective object, wherein generating the estimate of the three-dimensional surface shape of the reflective object comprises:

determining a set of neighboring two-dimensional reflected image points for a two-dimensional reflected image point in the reflected image pattern;

calculating a set of candidate three-dimensional surface point normal vectors associated with the two-dimensional reflected image point; and estimating a three-dimensional surface point of the three-dimensional surface shape of the reflective object associated with the two-dimensional reflected image point from the set of candidate three-dimensional surface point estimates using estimates of the three- dimensional surface shape at one or more of the neighboring two-dimensional reflected image points.

7. The method of claim 6 wherein the projected image pattern comprises a grid of dots, each dot formed using at least one pixel of a pixilated display device and separated from adjacent dots by a region of one or more pixels having a substantially different transmitted luminance.

8. The method of claim 6 wherein the image capture device is a digital camera and the reflected image pattern comprises a digital pixilated image captured by the digital camera.

9. A method for estimating a three-dimensional surface shape of an object having a specular reflective surface, the method comprising:

calibrating a position and direction of an image capture device relative to a support member of a positioning assembly;

projecting by a light transmitting device an image pattern on the specular reflective surface positioned on the support member of the positioning assembly;

capturing by the image capture device an image reflection of the transmitted image pattern reflected by the specular reflective surface;

determining adjacency information between a plurality of two-dimensional points in the captured image reflection;

estimating a three-dimensional point of the surface of the reflective object that corresponds to a two-dimensional point in the captured image reflection by minimizing a curvature function of a path that connects the first three-dimensional point to a previously estimated three-dimensional point of the surface that corresponds to an adjacent two-dimensional point in the captured image reflection; and displaying the estimated three-dimensional surface shape of the reflective object, wherein calibrating the position and direction of the image capture device comprises:

directing the image capture device toward the support member of the positioning assembly to align at least one reference point on the support member to a point on an image plane within the image capture device;

capturing an image by the image capture device of the support member of the positioning assembly that includes at least two reference points separated by a known distance; and calculating by a computational device the position and direction of the image capture device relative to the support member of the positioning assembly using the captured image.

10. The method of claim 9 wherein the projected image pattern comprises a grid of dots, each dot formed using at least one pixel of a pixilated display device and separated from adjacent dots by a region of one or more pixels having a substantially different transmitted luminance.

11. The method of claim 9 wherein the at least two reference points separated by the known distance is a pair of distinguishable marks scribed on the support member of the positioning assembly.

12. The method of claim 9 wherein the at least two reference points separated by the known distance is a pair of distinguishable marks projected onto a flat object positioned on the support member of the positio9ning assembly.

13. The method of claim 9 wherein the image capture device is a digital camera and the image reflection captured by the image capture device comprises a digital pixilated image captured by the digital camera.

14. A method for estimating a three-dimensional surface shape of an object having a specular reflective surface, the method comprising:
   calibrating a position and direction of an image capture device relative to a support member of a positioning assembly;
   projecting by a light transmitting device an image pattern on the specular reflective surface positioned on the support member of the positioning assembly;
   capturing by the image capture device an image reflection of the transmitted image pattern reflected by the specular reflective surface;
   determining adjacency information between a plurality of two-dimensional points in the captured image reflection;
   estimating a three-dimensional point of the surface of the reflective object that corresponds to a two-dimensional point in the captured image reflection by minimizing a curvature function of a path that connects the first three-dimensional point to a previously estimated three-dimensional point of the surface that corresponds to an adjacent two-dimensional point in the captured image reflection; and
   displaying the estimated three-dimensional surface shape of the reflective object,
   wherein the path comprises a cubic polynomial and the curvature function comprises a second derivative.

15. The method of claim 14 wherein the projected image pattern comprises a grid of dots, each dot formed using at least one pixel of a pixilated display device and separated from adjacent dots by a region of one or more pixels having a substantially different transmitted luminance.

16. The method of claim 14 wherein the image capture device is a digital camera and the image reflection captured by the image capture device comprises a digital pixilated image captured by the digital camera.

17. An apparatus, comprising:
   a processing unit;
   a light projecting device coupled with the processing unit;
   a fixturing device arranged to secure a part under test; and
   a light capturing device coupled with the processing unit,
      wherein the processing unit renders a pattern, the pattern being formed of a plurality of repeating regular shapes, wherein the light projecting device projects the pattern onto a surface of the part under test, wherein the projected pattern undergoes specular reflection from the surface and is captured by the light capturing device, wherein the captured image is processed by the processing unit, the processed image used to evaluate a surface quality of the surface of the part under test,
   wherein the reflected pattern is projected onto a relatively flat surface onto which a calibration pattern is located, and wherein a comparison between the projected pattern and the calibration pattern indicates a deviation from the calibration pattern.

18. The apparatus as recited in claim 17, wherein in addition to the projected pattern, a number of other projected patterns from at least another part under test are cumulatively projected on the calibration pattern indicating any deviations from an average value of the surface quality.

19. The apparatus as recited in claim 17, wherein the projected pattern comprises a grid of dots, each dot formed using at least one pixel of a pixilated display device and separated from adjacent dots by a region of one or more pixels having a substantially different transmitted luminance.

20. The apparatus as recited in claim 17, wherein the light capturing device is a digital camera and the captured image comprises a digital pixilated image captured by the digital camera.

* * * * *